United States Patent [19]
Bass et al.

[11] Patent Number: 5,563,955
[45] Date of Patent: Oct. 8, 1996

[54] APPARATUS AND/OR METHOD FOR RECOGNIZING PRINTED DATA IN AN IMAGE

[75] Inventors: J. E. Bass, deceased; late of Lowell; Dwight F. Mix, executor, Fayetteville, both of Ark.

[73] Assignee: The Board of Trustees of The University of Arkansas, Little Rock, Ark.

[21] Appl. No.: 616,624

[22] Filed: Nov. 21, 1990

[51] Int. Cl.$^6$ ................................................ G06K 9/20
[52] U.S. Cl. ........................ 382/101; 235/494; 235/463
[58] Field of Search ........................................ 235/462, 463, 235/436, 470, 494; 382/54, 42, 48; 364/237.85; 358/446

[56] References Cited

U.S. PATENT DOCUMENTS

| | | | |
|---|---|---|---|
| 4,704,519 | 11/1987 | Kulikauskas | 235/494 |
| 4,822,986 | 4/1989 | Guthmueller et al. | 235/462 |
| 4,845,761 | 7/1989 | Cate et al. | 382/1 |
| 4,853,969 | 8/1989 | Weideman | 382/54 |
| 4,874,933 | 10/1989 | Sanner | 235/470 |
| 4,989,100 | 1/1991 | Ishima | 358/483 |

*Primary Examiner*—Michael Razavi
*Assistant Examiner*—Steven Klocinski
*Attorney, Agent, or Firm*—Hermann, Ivester, Hill, Van Santen, Steadman & Simpson

[57] ABSTRACT

A system for recognizing and locating in an image, printed data of a known spatial characteristic. A digital matched filter is used to identify the presence of the printed data via an auto correlation between the filter coefficients and the printed data. When an auto correlation is identified, approximate areas are selected and further processing is undertaken only within such areas.

10 Claims, 14 Drawing Sheets

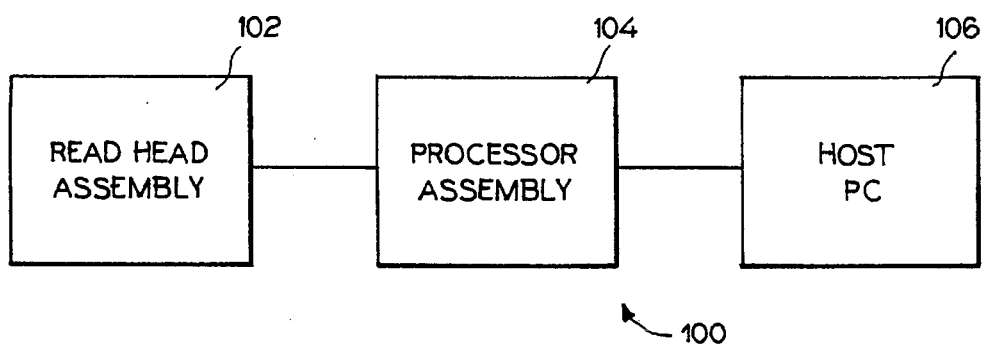
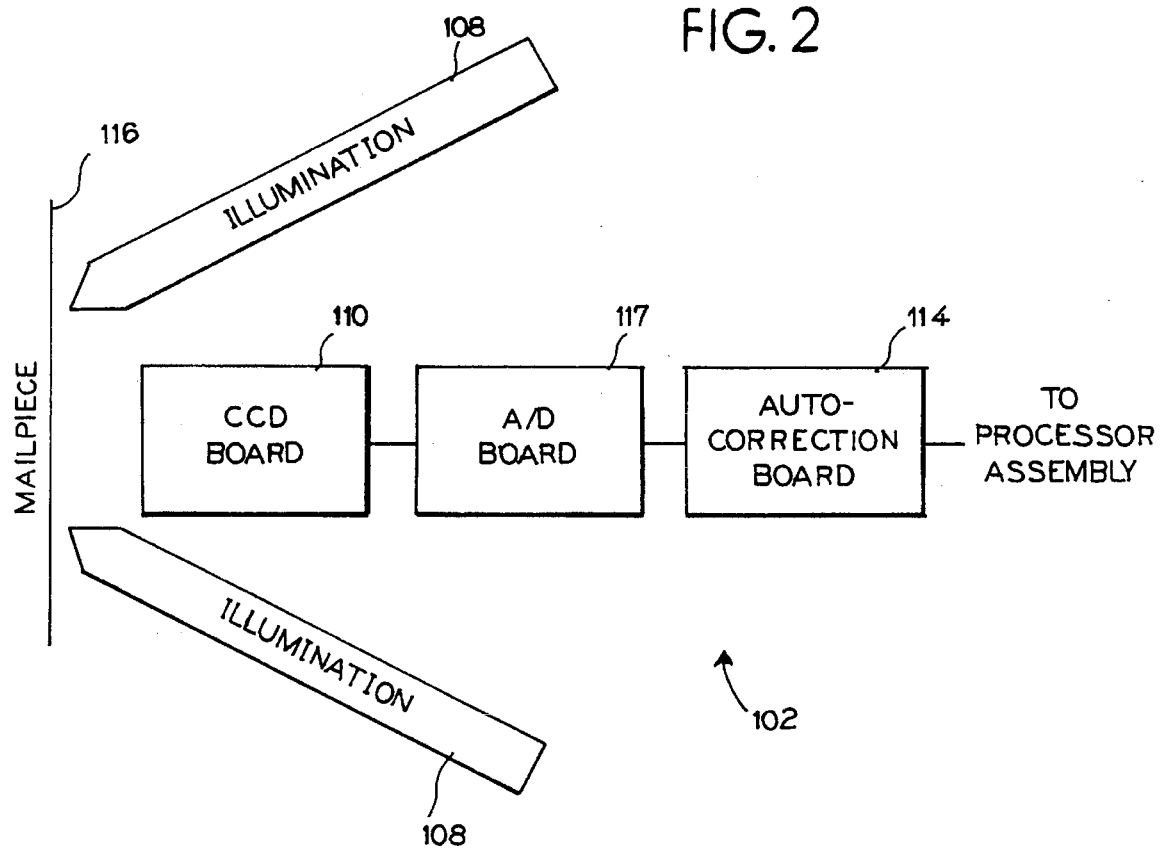

APPARATUS AND/OR METHOD FOR RECOGNIZING PRINTED DATA IN AN IMAGE

BACKGROUND OF THE INVENTION

The present invention generally relates to image recognition methods and apparatus. More specifically, the invention relates to methods and apparatus for identifying, extracting, and interpreting a portion of the image prior to detailed image processing/recognition processing.

The United States Postal Service has rights in this invention pursuant to Contract No. 104230-88-0-2943.

Humans have the ability to process visual images at a relatively instantaneous rate. Once an image is captured, the human brain quickly and virtually instantaneously interprets the entire image, as well as portions thereof. Humans are able to virtually instantaneously decipher useful information in the image despite the presence of "noise, . , " i.e. irrelevant information. For example, one can virtually, instantaneously recognize a printed word in an image despite degradation due to background clutter.

There has been much research over the years regarding the configuration of machines, most notably computers and electronic devices, to perform image recognition processing at a rate approaching and enjoyed by humans, or faster. Such a rate as referred to as real-time processing. However, the task has proven difficult. The simple process of identifying differences between two objects or pieces of information can take millions of calculations and require relatively long periods of time. Thus, many real-time processing applications, time is not available to perform detailed image processing over an entire image.

In an effort to enhance mail delivery and to accommodate the ever increasing volume of mail delivered in the United States, the United States Postal Service (USPS) developed a bar code (hereinafter referred to as the "POSTNET" bar code, "POSTNET" being an acronym derived from Post Numeric Encoding technique) for use on mail that would be applied both by the USPS and its customers. The idea was to provide a code that could be quickly recognized and interpreted by a machine.

The POSTNET bar code comprises a series of tall and short bars, and has thus far been placed in the lower right-hand corner of an envelope or card. To accommodate the maximum types of printing technologies, a visible code was selected. Internal to the USPS, the code generally is applied using ink jet printing devices. Most mailers have printed the bar code using offset printing at the time a batch of reply mail pieces is printed. Bar code readers play a significant part in the automation process used by the USPS. Present readers have limitations imposed on them by earlier designs and by the characteristics of the bar coded mail pieces. Presently, the bar code readers use relatively simple techniques for detecting one bar at a time. Further, these readers depend on locating the bar codes at closely predefined positions on mail pieces.

Existing operational apparatus and methods are able to detect and read POSTNET bar codes only in a limited, defined clear zone that can have no extraneous printed or background information. Such conditions exist only as desired goals and some letter mail suffers because the bar code is lost in background clutter. These apparatus cannot locate a bar code outside the predescribed area.

The wide variety of pigments and dyes employed in the printing processes to produce an almost infinite advertising copy, printed matters, and other interfering data results in the existing bar code readers rejecting a certain percentage of the mail pieces being processed.

It is, therefore, highly desirable to provide a bar code reader that can effectively identify and interpret a bar code on a piece of mail despite the inclusion of a lot of background "noise," such as graphics printing or alphanumeric printing.

Additionally, it would be helpful to be able to accomplish the foregoing independent of the location of the bar code. This capability will permit any major mailer to print his own USPS bar code at any point on the mailpiece and not be restricted to the current limited acceptable location. The major mailer will receive favorable postal rates by printing the bar code which the USPS has had to do in the past.

In addition to the POSTNET bar code, however, it would also be beneficial to recognize other printed information, such as address block printing so that it also can be extracted from a noisy background and interpreted for letter mail not having bar codes.

SUMMARY OF THE INVENTION

The present invention provides a method and apparatus for the recognition of printed data of specific characteristics in an image. More specifically, the invention provides a method and apparatus for locating and extracting specific printed data from an image containing other printed data and graphics printing.

To these ends, the invention provides a high speed method of image pre-recognition processing to reduce the areas of an image to be processed by a factor of 10 or more. Further, the invention provides the capability to discard all image areas not containing specific print characteristics of interest much as the human performs a pre-recognition filtering function and focuses his retina only on printed areas of known interests and characteristics.

In an embodiment, the invention provides that an image is scanned or created and the image data derived therefrom is subject to digital matched filtration so that printed data of a known characteristic can be identified.

In a particular embodiment, the invention provides that the basic characteristics of the printed data used for its identification is its pitch.

In another particular embodiment, the invention provides that the printed data comprises a bar code.

In one embodiment of the invention, an apparatus for locating specific printed data within an image includes an imaging system whose output is subject to matched digital filtration and whose filter coefficients are selected to correspond to a known characteristic of the specified printed data.

In another embodiment of the invention, means are provided for isolating the specific printed data and for interpreting the data to extract information contained therein.

An aspect of the invention is a method and apparatus for locating within an image printed data having an identifiable characteristic.

Another aspect of the invention is a method and apparatus for locating within a visual field printed data having a particular pitch.

These and other aspects and features of the invention will become clearer with reference to the following detailed description of the presently preferred embodiments and accompanying drawings.

BRIEF DESCRIPTION OF THE DRAWINGS

FIG. 1 is a general block diagram of a system embodying principles of the invention.

FIG. 2 is a block diagram of the read head assembly of FIG, 1.

DETAILED DESCRIPTION OF THE PRESENTLY PREFERRED EMBODIMENTS

Figure 3:
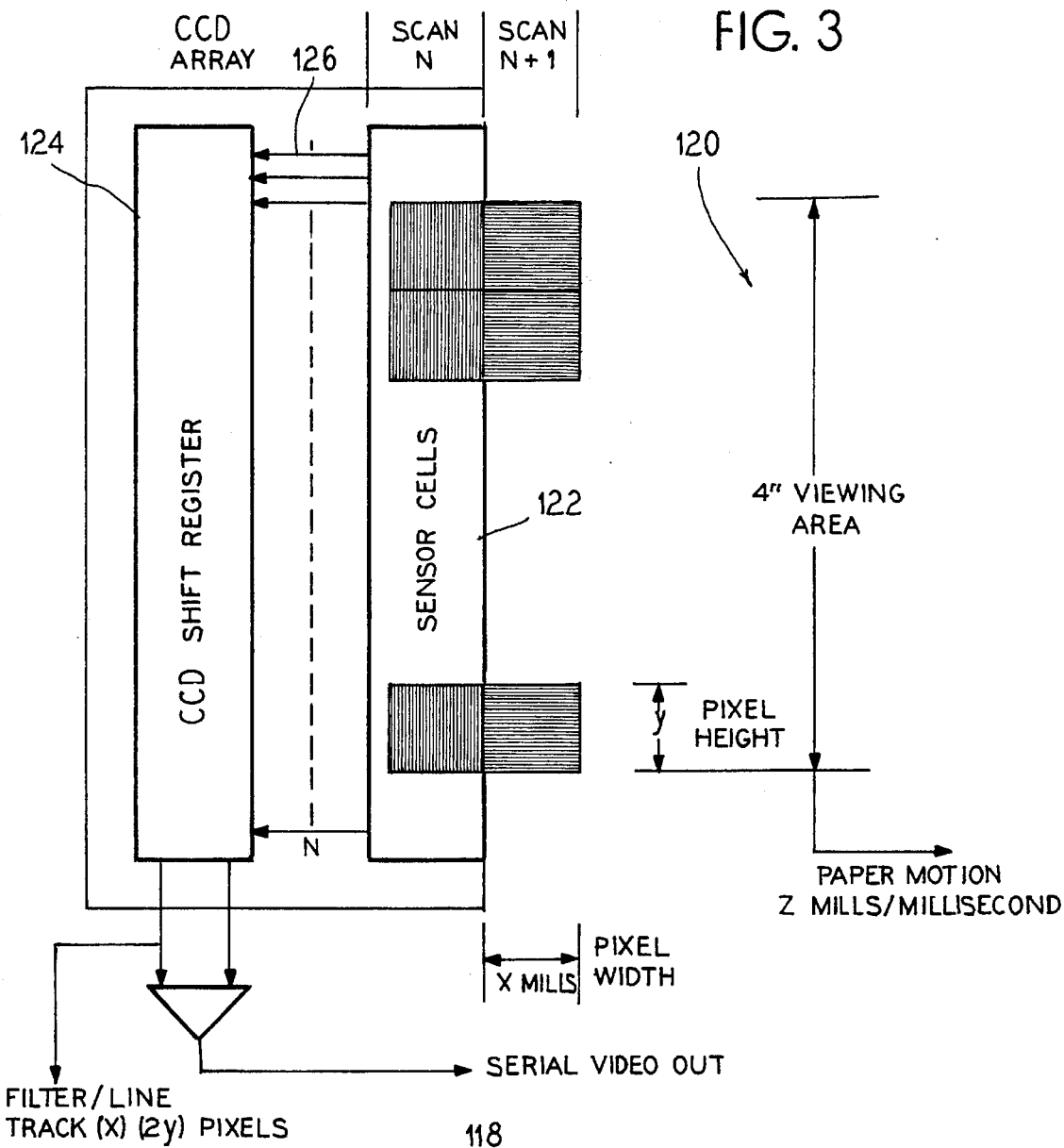
FIG. 3 is a schematic of a CCD array used as an image sensor in the read head assembly of FIG. 4.

In accordance with the invention, a system for recognizing and extracting specific printed data from an image utilizes a filter, preferably a digital matched filter, to filter image data to identify the presence and location of the specific printed data. Once the specific printed data is located, it can be isolated and interpreted. Such a system is described below.

The present inventor initially developed a system for recognizing specifically typed data on a page or envelope. The inventor developed a system for identifying typed data of specific pitches, the pitch data being the distance between center line of the symbols used, for example, letters. Thus the inventor was able to locate address information typed on an envelope, with a priori knowledge of the pitch of the lettering, even though other printing and graphical/pictorial printing was present along with the known pitch data.

A research project undertaken by the inventor for the USPS enabled further development and testing of the system, specifically with respect to the location of POSTNET bar codes. This system is described below. However, it can be appreciated that while the system described below is discussed in the specific context of POSTNET bar code recognition, the invention is of much wider applicability.

Overview

To provide for location and interpretation of POSTNET bar codes on mail, a system 100 generally illustrated in FIG. 1 was developed. The system 100 is a very high speed image processing system which relies on digital filtering at a 10 megahertz pixel rate to locate printed matter of interest. To locate the printed matter of interest, digital filter coefficients are designed so that the filter responds only to printed matter with a spatial characteristic such as a specific pitch. All other printed matter, except for printed matter having the specific pitch, is essentially not seen by the filter.

By use of the filtering technique, it becomes unnecessary to examine, in detail, every group of pixels in the image. The filter, through cross correlation processing, significantly reduces processing times over all other traditional image analysis techniques; this making real-time high speed processing of mail pieces possible in less than 40 milliseconds.

The digital filter device used looks at up to 0.5 inches of an image scan simultaneously. Any pattern which repeats over that viewing area creates a strong response from the filter if the filter coefficients have been designed to identify that repeating pitch.

The location of printed matter of interest relies on two parameters: (1) the amplitude response from the filter being greater than a threshold, and (2) the duration of the amplitude response being greater than a predetermined time period. Both criteria have to be met to signal the presence of printing which the filter's coefficients have been designed to detect.

As can be seen, the system 100 generally comprises three sub-systems: a read head assembly 102; a processor assembly 104; and a host computer assembly 106. These sub-systems are described below. To understand the system 100, however, it is helpful to be further apprised of the nature of the specific problem presented. Thus, the POSTNET bar code specifications are discussed first.

The POSTNET Bar Code

One characteristic of the POSTNET bar code is that the spacing between the bars thereof is specified to be constant. This spacing, or distance between center lines of the bars, is referred to as pitch. Accordingly, because the spacings between center lines is constant, it can be stated that the POSTNET bar code has a constant pitch.

Besides being self-clocking with its constant pitch, bar code groupings disposed in the lower right-hand corner of a mailpiece are always 32 bars or 52 bars in single sets, or 32 and 37 bars in two sets. An additional pattern of 27 bars or 27 bars in combination with 37 bars is also being considered. Bar codes in the address block will have 52 bars.

Within these sets, each code character is made up of five bars, two full bars and three half bars. Any set of bar code groupings will always have a full bar (frame bit) at the beginning and end of the set.

These characteristics provide a first order approach to analyze and extract the code when interference is present. Because the POSTNET code has such well-established characteristics, it is possible to determine the code when several bars are misread or missing. For example, a check digit provides one way of determining where a bar (full or half) is misread from the code and provide for reconstruction of the bar code.

The basic elements of the printed code are bars and half-bars, representing binary-"1's" and "0's" respectively. The maximum and minimum dimensions for these bars are specified by the Post Office.

Each code character represents a numeric digit and is made up of 5 bars. Specific combinations of two full bars and three half bars have been assigned to represent the ten numeric digits, 0 through 9, as follows:

| | |
|---|---|
| 0 | 11000 |
| 1 | 00011 |
| 2 | 00101 |
| 3 | 00110 |
| 4 | 01001 |
| 5 | 01010 |
| 6 | 01100 |
| 7 | 10001 |
| 8 | 10010 |
| 9 | 10100 |

Only the ten combinations shown above are valid code characters. These represent all of the possible combinations of two full bars (1's) and three half bars (0's). This feature is central to the error recovery features of POSTNET, since reading a combination of five bars and half bars having other than two full and three half bars will be interpreted by the system as an error.

While each code character is fully defined by the assigned combinations of bars shown above, some data processing procedures may be simplified by an understanding of the mathematical origin of the assignment. The numerical value of each valid combination, with the single exception of zero, may be determined by summing the "weights" of the two positions within each character which are occupied by the one bits. From left to right, the bit positions are weighted 7, 4, 2, 1, and 0. For example, the combination half bar-full bar-half bar-full bar-half bar (01010) has one bits in the second (weight 4) and fourth (weight 1) positions. Summing 4 and 1 yields 5, which is the assigned value of 01010.

The combination full bar-full bar-half bar half bar-half bar (11000) has a total weight of eleven. This combination has been assigned the value of zero.

The imprinted bars conform to minimum and maximum bar character outlines. These outlines are defined for both full (tall) and half (short) bars. Each bar completely covers the minimum bar character outline but does not exceed the maximum character outline depicted. A full bar (1) is 0,125±0,015 inches in height. A half bar (0) is 0,050±0,015 inches in height. The width of the bars are nominally equal. In no case are the bars less than 0,015 or more than 0,025 inches in width.

The horizontal spacing is such that there is 22±2 bars/inch. Thus the POSTNET code pitch is 0.0454±0.0042 inch.

POSTNET is designed to be used with the USPS' nine digit ZIP+4 code. The information contained in the code is a character-by-character representation of the nine digit ZIP+4 code or of some selected part of it. Each character is represented by 5 bits as defined above. In addition, each time that a code field is printed, one additional character is encoded along with ZIP+4 code. This character, used as part of the error recovery system, is called the "correction character."

The correction character is always selected so that the sum of all of the digits in code field being printed is an integral multiple of 10. For example, given the ZIP+4 code 2345-6789, summing the 9 digits yields 45. A correction character "5" will result in the sum of the 10 digits being an integral multiple of 10.

A substitution error is the reading of a half bar as a full bar or vice versa. The POSTNET code was designed specifically to detect substitution errors and provide a means of recovering from the error to the greatest extent practical. The discussions which follow have been drafted in the context of the full 52-bit code (10 characters), but apply in a parallel fashion to the 32-bit field and the 37-bit field as well (6 characters and 7 characters respectively). In the context of this specification, "correctable" does not imply the physical modification of the bar code, only the ability to determine the correct value of the affected character(s) and to process accordingly, e.g., sort, rather than reject a mailpiece.

The ten valid code characters were defined above as being the ten combinations of 2 full bars and 3 half bars. All other combinations are invalid. Any reading of a code character (a sequence of 5 bits) having other than 2 full bars and 3 half bars, therefore, is known to contain a substitution error. All substitution errors are detectable with the exception of "offsetting" errors in which either one or two one bits are misread in a single character along with an equal number of zero bits. Experience has shown that the incidence of this type of error is extremely low.

A substitution error affecting only a single code character is always correctable. The affected character identified by its failure to meet the test of having exactly two one bits and three zero bits. The correct value for a single affected character is determined by subtracting the sum of the nine valid characters from the next higher multiple of ten. If the sum of the 9 valid characters is itself a multiple of ten, the affected character is zero.

If a complete bar code is read in which no substitution errors are detected, but in which the sum of the individual characters is other than an integral multiple of 10, the mailpiece must be rejected. This is an indication of offsetting substitution errors or of a truncated code and will probably result in a missort if not rejected.

With the foregoing further background, the configuration of the System 100 can be further appreciated.

Read Head Assembly

The read head assembly 102 generally comprises the apparatus necessary to provide digital data relating to a visual image to the processor assembly 104. Thus, as illustrated in FIG. 2, the read head assembly 102 generally includes illumination devices 108, a sensor 110, an analog/digital converter system 117, and an image correction system 114. The output of the read head assembly is provided to the processor assembly 104.

The speeds of passing mail pieces 116, field of view of the sensor 110, and the resolution requirements generally determine the basic characteristics of the read head assembly used. The following discussion provides the rationale used in determining those characteristics.

The illumination source 108 was chosen to supply the special characteristics and the levels of intensity needed to support the sensor 110 chosen for the application. The sensor 108 had to be sensitive enough to minimize illumination levels needed and fast enough to support the resolution requirements and transport speed (i.e., speed of passing mail) requirements. An optics system was chosen to provide the magnification ratios to match the object image size to the physical sensor array size and be as free to distortions as possible. The optics system also had to support the depth of field requirements of mail processing.

The resolution required of the sensor 110 is a function of the general print characteristics of the bar code patterns. The pitch of the bar code is 22±2 bars per inch, or 45.45±5.0 mils centerline to centerline spacing. The maximum bar code width is 25 mils; the minimum bar code width is 15 mils.

A conservative design rule in determining horizontal resolution was to require about two pixel cell widths for the minimum bar code stroke width and the minimum white separation between bars. The minimum stroke width was given as 15 mils; the minimum white separation was determined by the condition of maximum bar pitch (minimum distance between bars) and the maximum bar width, given as 25 mils. The minimum white separation was then 41 mils−25 mils=16 mils. From these considerations, the horizontal resolution was determined to be 7.5–8.0 mils to provide two samples each per bar printing or white space.

The consideration for the vertical resolution relates to the area to be scanned (4,000 mils in this case) and the number of elements available in a sensing element. Because of the high data rates involved and in the possible requirements for paralleling sense electronics, it was desirable to minimize the number of elements in the scanning array. Scanning sensors come in standard sizes of 128, 256, 512, and 1024 elements. For a 512 element array scanning 4,000 mils, the pixel cell resolution is 4,000/512=7.8125 mils on the paper. This vertical resolution falls within the horizontal resolution range determined above, so a good selection of resolution would be 7.8125 mils ×7.8125 mils; this provides a square pixel area which is consistent with the geometry of the individual sensor cells proposed for use.

The minimum number of pixels for the shortest full bar would be 115/7.8125=14.7; the minimum number for the shortest half bar would be 40/7.8125=5.12. To further reduce processing rates and to discriminate against high frequency background noise, the vertical resolution was chosen to be 15.6 mils; the horizontal resolution was chosen to be 7.8125 mils. This provides a minimum of 7 pixels per tall bar and 3.8 pixels per half bar. These values are sufficient for reliable bar discrimination and reduces processing time by 50% and drops out all background noise less than 5–6 mils in vertical size. The 15.6 mil vertical resolution is achieved by averaging adjacent vertical 7.8125 mil pixels.

CCD Array

A schematic of a CCD sensor 118 usable as the read head assembly sensor 110 is illustrated in FIG. 3. Vertical resolution is fixed by the area 120 to be scanned (4 inches), number of sensing cells/elements 122, and the accompanying magnification requirements. Horizontal resolution is adjustable over a range by varying the scan time, and thus the integration time of the sensor, in the horizontal direction. The maximum resolution is determined by the minimum scan time of the sensor.

As illustrated, the elements 122 have outputs coupled to a shift array 124 by suitable lines 126.

Since odd/even shift registers within the array are used in most linear sensing arrays, the number of shift times required for a 512 element is 256 since the odd/even registers work in parallel. For a 10 MH array, or 100 nanosecond clock, it was determined that it would take (0.1)(256)=25.6 microseconds to unload the array; that was also the minimum integration time available for the sensor.

The primary rationale for selecting the minimum horizontal resolution (maximum pixel size) was to (1) obtain maximum integration time to reduce light level requirements on the array, and (2) to reduce the data handling rates and volume of data requirements in a wide area search. For example, for a 41 sq. inch (4Δ×10.25") area, 5.12 mil resolution would require $[1000/5.1212=(195.3)^2=38,144$ pixels/sq. inch, or a total of 1,563,925 pixels. On the other hand, a 7.8125 mil resolution requires $(128)^2 \times 41=671,744$ pixels, or only 43% of the higher 5.12 mil resolution requirements. Thus, for a complete system, high resolution is very expensive and the goal is to select the lowest resolution possible without sacrificing performance. In noisy images, higher resolution can actually degrade performance by reducing the low pass filtering effects of a coarser resolution.

A 15.6 mil horizontal resolution was determined to provide only a one pixel sample for a minimum stroke width or a minimum white separation and since the sampling time of the system was not synchronized in space with the bar code printing on an envelope or mail piece, depended on a single sample to align over a minimum stroke bar code. If the single sample aligned half on the bar and half off the bar, then the bar could pass undetected. This spatial situation is analogous to Nyquist Sampling requirements of sampling twice the highest frequency present in the frequency domain.

The incentive to go to a coarser resolution horizontally, in addition to reduced data rates and volumes, would be to enjoy increased sensor integration times, or reduced light intensities. The cost, however, might be reduced bar code reading capability. Thus, horizontal resolution was set at 7.8125 mils.

The key parameters considered in the sensor array selection were (1) situation exposure specifications and (2) output data rates which, in combination with the number of pixels needed for the resolution desired, establish the minimum integration times of the array. These factors then determined the amount of light intensity needed to operate the imaging function. The sensing function was built around commercially available sensor arrays because of the high costs of custom designs.

The sensor chosen for this application was the RETICON (TM) RL0512D. From the transfer characteristic curve of the RETICON D (TM) Series linear arrays, the saturation exposure was determined to be 0.3 (10)−6 microjoules/cm$^2$. Dividing this value by the integration time of the array, in this case 42 microseconds, and converting to foot candles gave the saturation illumination needed for the selected array:

Sat. Illum.=(0.02) (10)−6(0.3) (10)−6/(42) (10)−6=142 foot candles

Assuming a 5% efficiency from the paper to the sensor, the paper illumination level should then be about 2,800 foot candles.

Figure 4:
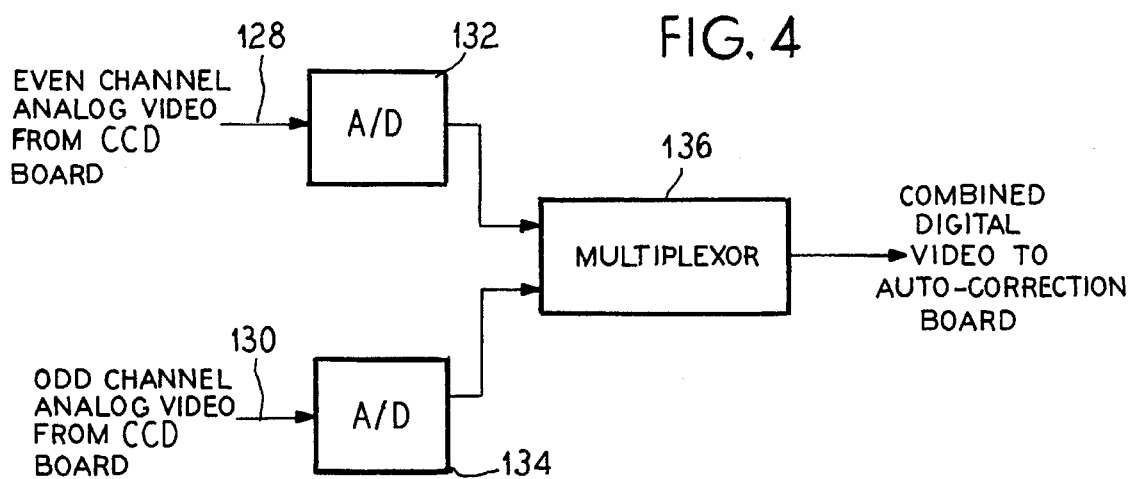
FIG. 4 is a block diagram of a portion of the read head assembly of FIG. 3.

As illustrated in FIG. 4, sensor 110 includes two channels 128 and 130, each providing analog grey scale data relating to a scanned image. Channel 128 contains an even channel analog video signal while channel 130 contains an odd channel analog video signal. Each signal is subject to separate A/D conversion by an A/D converter 132 or 134, respectively, and then multiplexed by a multiplexor 136 for output to the remainder of the read head assembly. The dual A/D converter approach eliminates the need to analog multiplex the low level CCD signals into a single A/D converter; analog multiplexing low level signals induce clock noises into the signals of interest.

Image Correction

The data provided by the read head assembly 102 to the processor assembly 104 comprises digital data relating to image pixels. In accordance with one aspect of the invention, however, the digital data does not necessarily relate directly to the real image but instead can be degraded by one or more elements in the optical, illumination, and/or sensor stages.

Figure 5A:
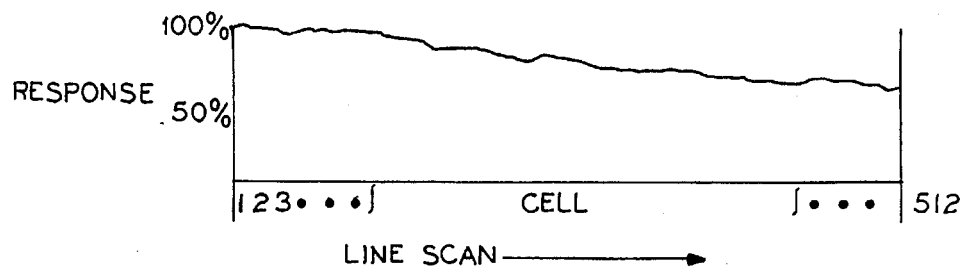
FIGS. 5(a) and (b) are graphs illustrating errors that can occur in an output of a CCD array.
Figure 5B:
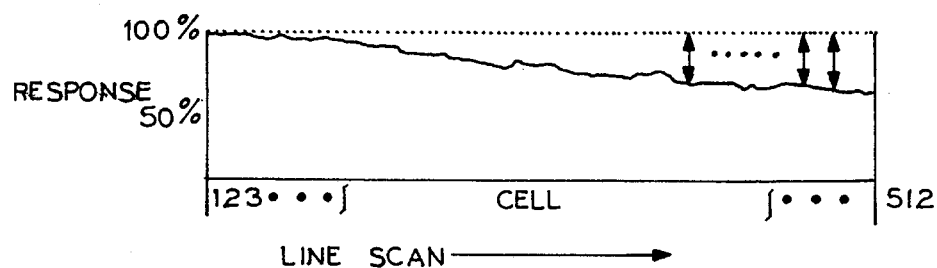

Essentially, as illustrated in FIGS. 5 (*a*) and (*b*), distortions can be introduced into the output of the read head assembly by virtue of the characteristics of the equipment used. For example, the lens used may not be exactly shaped, the CCD array used may not be exactly doped, etc. These distortions can be referred to non-linearities. As a result of such non-linearities, an original image can be distorted such that it is not truly represented at the output-(the lifted image) of the read head assembly. For example, as illustrated, all may not provide a full output response upon reading of a white space.

Figure 6:
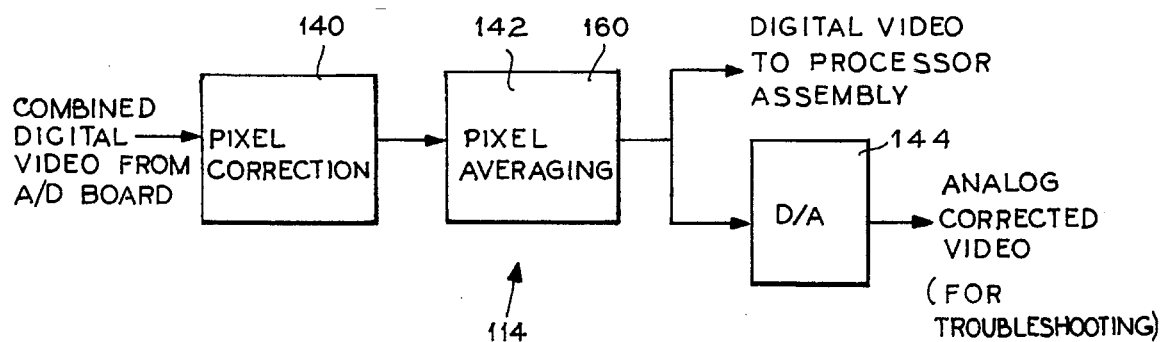
FIG. 6 is a block diagram of an image correction assembly used in connection with the system of FIG. 3.
Figure 7:
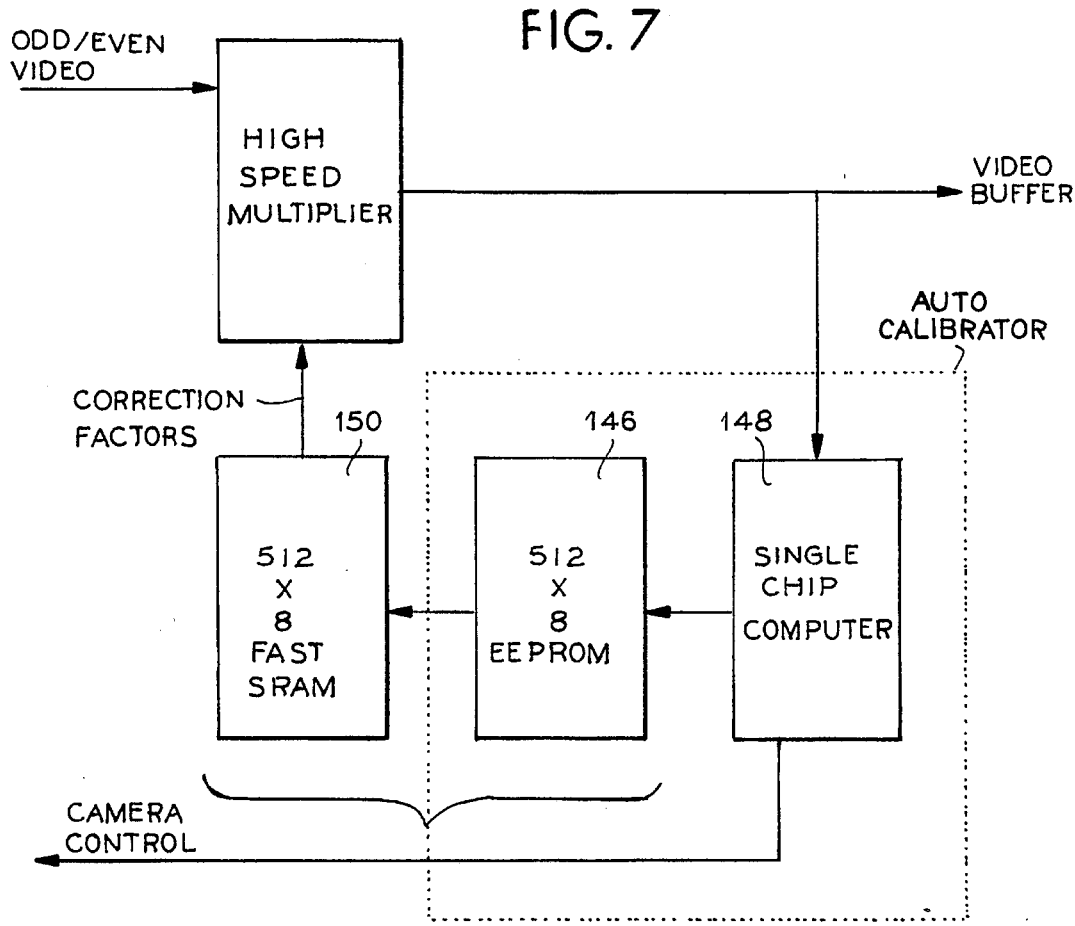
FIG. 7 is a more detailed block diagram of the image correction assembly in FIG. 6.

However, in accordance with one aspect of the invention these distortions or non-linearities are compensated or corrected by means of the correction system 114, illustrated more fully in FIGS. 6 and 7.

As illustrated, the data output by the multiplexer 136 is subjected to pixel correction by pixel correction circuitry 140 and pixel averaging by pixel averaging circuitry 142 before transmission to the processor assembly 104. The output of the pixel averaging circuitry 142 preferably is also converted to an analog signal by a D/A converter 144 to provide a tap for troubleshooting purposes.

Essentially, the correction system 114 maps the digital image data output by the multiplexer 136 to eliminate these distortions. This is done by using a reference white target area for the camera; for perfect sensing, all of the cells 122 (512) should generate the same value of output. The image correction method used determines the whitest pixel output for one pixel in the CCD sensor 118 and uses this value to compute a correction factor for each of the other 511 pixels. A table of correction factors is then formed and stored.

As illustrated in FIG. 7, this table of correction factors is stored in 512 byte EEPROM (electrically erasable programmable read only memory) 146 under control of a microcomputer 148 which calculates each correction value to be used. The 512 byte EEPROM 146 is used for correction factor data retention, even under power off conditions. This process is referred to as the auto-calibration process.

After the auto-calibration process is completed, the auto-correction function is available for all image sensing. At the start of image correction functions, the correction factors are moved to a fast static random access memory (SRAM) 150 memory of 512 locations by the microcomputer so that correction factors can be accessed at a data rate compatible with the incoming video image data.

Auto-correction is accomplished by multiplying the video data from each CCD sensor pixel with its unique computed and stored correction factor which was derived during the auto-calibration mode. In this manner, each pixel has its own unique gain, or correction factor, required to raise its output value to that of the highest pixel output seen during the auto-calibration phase with a white reference input. A suitable fast multiplier 152 is used for this purpose.

This method of correction, or de-convolution of system non-uniformities, corrects all distortions and non-uniformities in the sensing system, regardless of its origin.

Figure 8:
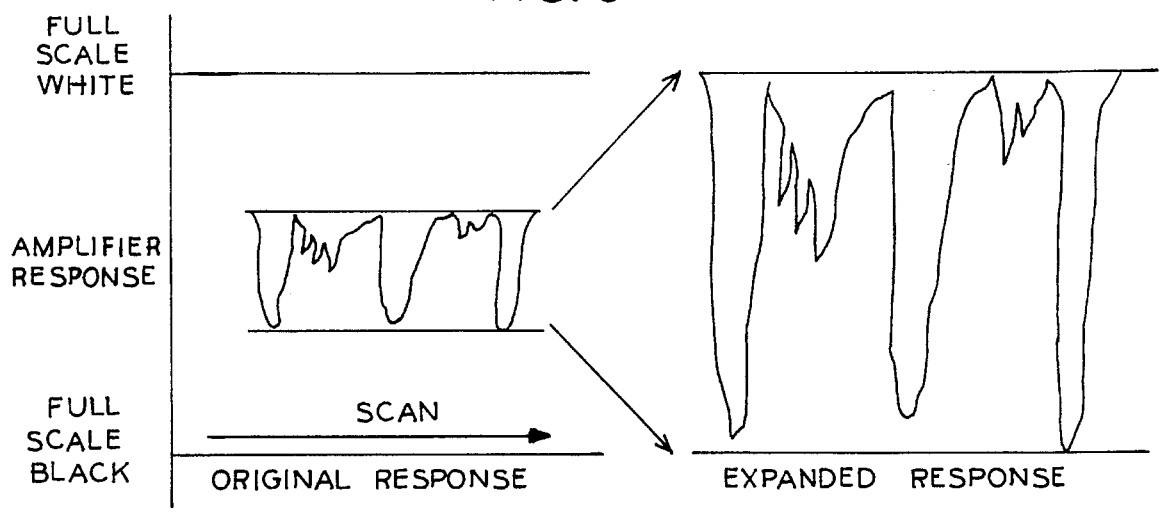
FIG. 8 illustrates dynamic ranging effects on a signal.

This same circuitry can also provide a function of automatic digital gain control by determining the blackest black and the whitest white pixel in a scan, and then providing correction values to the correction memory which, when multiplied with the pixel data, expands the maximum and minimum values seen to system full scale values prior to further image processing. This is illustrated in FIG. 8.

Subsequently, the pixel averaging circuitry 142 averages odd and even pixel data to produce an output that is half the vertical resolution (15.25 mils) of an acquired image. This is done "on the fly" so that no time is lost by submitting the data to this process. Reduction of vertical resolution has little effect on bar code recognition and aids significantly in dropping out high frequency background interference.

Processer Assembly

As illustrated in FIG. 1, the processor assembly 104 is disposed to receive the corrected digital image data from the read head assembly 102. The processor assembly 104 is used to identify the presence and location of specific data of interest such as a bar code image in a video memory/buffer.

Figure 9:
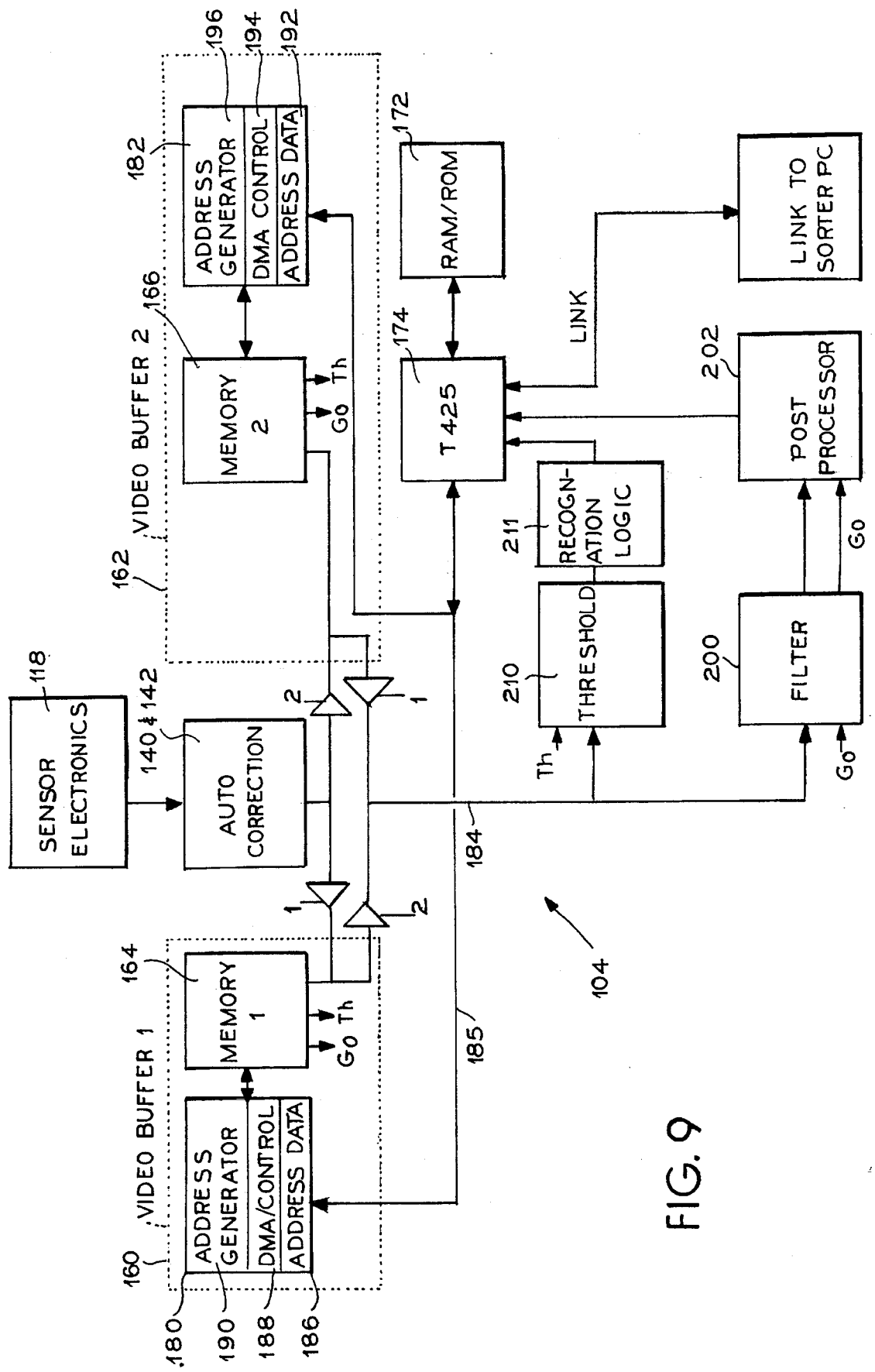
FIG. 9 is a block diagram of a processing assembly used in the system of FIG. 1.
Figure 10:
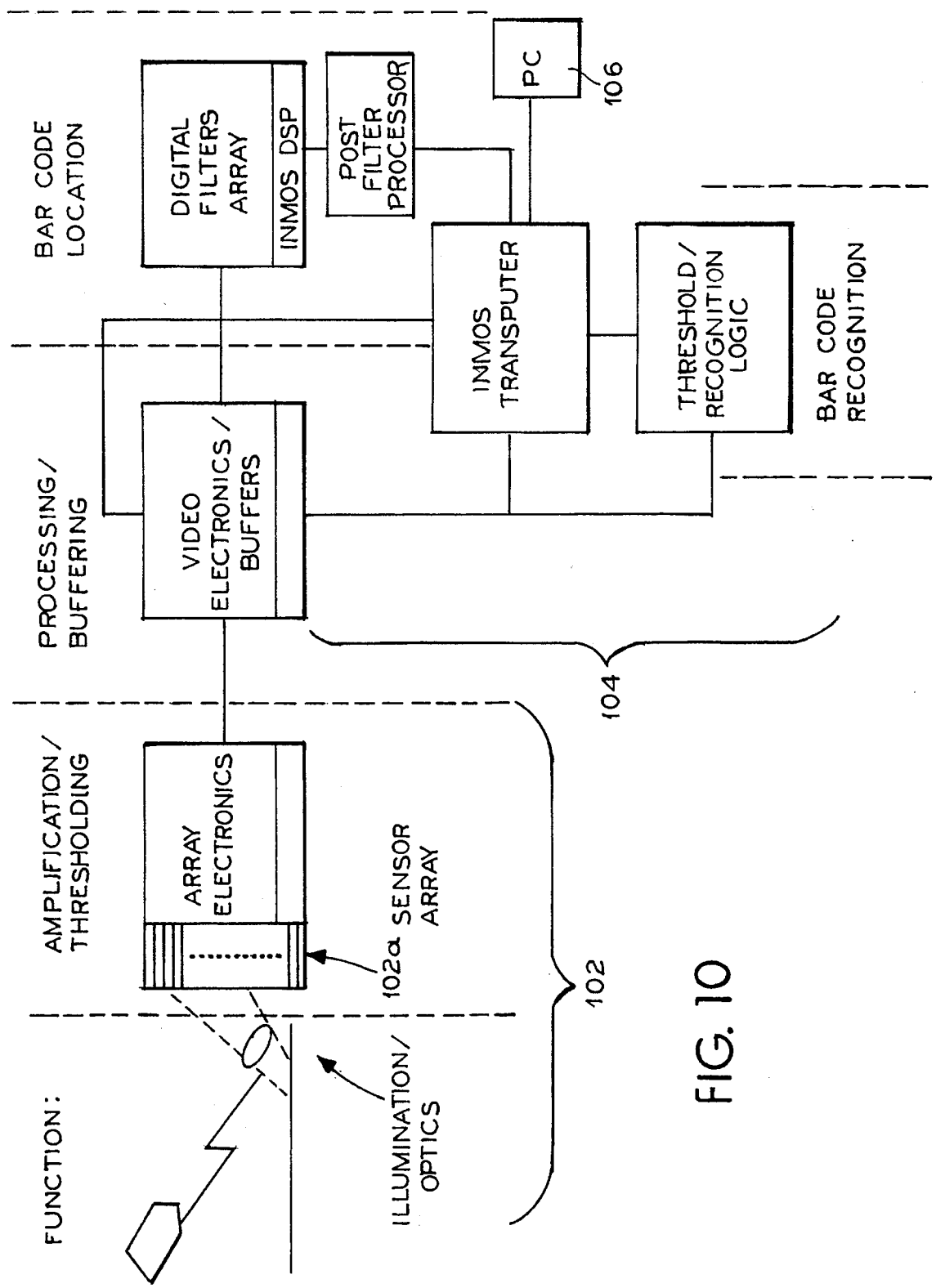
FIG. 10 is a functional diagram of the processing assembly of FIG. 9.

As illustrated in FIGS. 9 and 10, the digital image data output from the read head assembly 102 is received by a buffer or memory system comprising a first video buffer 160 and a second video buffer 162. As will become clearer below, the digital image data is only received by one video buffer at a time, the other video buffer instead providing its previously loaded contents, or a portion thereof, to the remainder of the processor assembly 104.

Essentially, each of video buffers 160 and 162 is constructed so as to receive digital image data in the form of vertical scan lines from the read head assembly 102. To that end, video buffer 160 includes a suitable memory 164 and video buffer 162 includes a similar memory 166. When one video buffer has been fully loaded, the other video buffer can be used to commence receiving image data relating to a subsequent piece of mail while the new image is being processed.

The buffer system preferably is constructed so as to have several special functions. These functions include the ability to load the digital image data received from the read head assembly 102 vertically, i.e., as vertical lines or columns. However, when data is output by a memory 164 or 166, the data can be output horizontally, i.e., as horizontal lines or rows, for filtering purposes.

Further, the buffer system provides for the outputting of only a portion of a memory's contents upon receipt of four coordinates which define a window. Such a window can then be output vertically, i.e., as vertical lines or columns to specific portions of the processor assembly 104.

The DMA control functions 180 and 182 preferably store both vertical address coordinates and horizontal address coordinates. Switching between the coordinates is effected automatically by the DMA controls 188 and 194 as a function of a state of the processor assembly 104, i.e., what processing step is being executed, as will become clearer below. The buffer system also includes integral, direct memory access (DMA) control via DMA control functions 180 and 182, so that upon receipt of address coordinates from a transputer 174 assembly, the contents of an area of the memory 164 or 166 associated therewith will be automatically dumped onto an image data bus 184 independently of further actions by the remainder of the processor assembly 104. As discussed below, the buffer system logic processes image window coordinates via the DMA control function 180 and 182 independently of the remainder of the processor assembly 104.

As illustrated, the DMA control function 180 includes an address register 186, a DMA controller 188, and an address generator 190. The controller 188 is operative to receive coordinates from the register 186 and to calculate the memory locations relating thereto. Via the address generator 190, the controller 188 is operative to rapidly access a window of the memory 164 of a pre-selectable size defined by the coordinates and have the contents thereof dumped onto the bus 184. For example, given a start and stop address and placement of the processor in a mode requiring horizontal scan data, the controller 188 is operative to output preselected vertical scans within horizontal rows of data of a length determined by the start and stop addresses.

In a similar manner, DMA function 182 includes an address register 192, DMA controller 194, and address generator 196.

When image data is dumped by one of the memories 164 or 166 onto the image data bus 184, the associated DMA control 188 or 194 causes the memory 164 or 166 to issue a "Go" or "Th" signal. A "Go" signal signifies that the processor 104 is in a state during which it is to be determined whether a bar code might be present in an image, and if so, approximately where in the image the bar code could be located. The "Th" signal signifies that the image data being output onto the data bus 184 is to be subjected to thresholding, as described below, to determine where in a potential window a bar code is located.

Start and stop addresses are provided to the DMA control functions by a computer 174 via an address data bus 185. The computer preferably is a transputer having model No. T425 manufactured by INMOS Corporation. Associated with the computer is a RAM/ROM memory 172 for storage of image address data.

Further buffer system capabilities are discussed below.

Filtering

The problem of finding specific printed data such as a bar code line in a 41 sq. inch image area containing 671,744 pixels in 55 to 60 milliseconds is a difficult, if not impossible task if approached with conventional image processing methods. Time is not available to access most pixels more than one time. Data flow processing methods which operate on data streams with little or no addressing overheads are required to even access all the data in the given time for processing. Stored program computers are also not appropriate for main kernel processing because of the high overhead associated with stored program processing. Dedicated hardware functions are the only practical solutions to the high speed image searching functions needed. In the present system, a digital matched filter approach was implemented for bar code print location whereby horizontal image scans are subjected to digital matched filtering.

Digital signal processing (DSP) techniques for the extraction of signals of known characteristics when deeply embedded in noise have reached a high degree of development and sophistication because of needs in military signal processing application. The computationally intensive algorithms using digital filtering techniques have been refined and reduced to application specific semiconductor technology to provide the high processing rates required in high performance applications. high performance DSP devices have been reduced to pipeline structures with massively parallel computing paths to accommodate the high processing rates required. For example, an IMNOS ISA 100 DSP device, which was used herein, processes up to 10 MH grey scale data with a 32 tap digital filter. Each device contains 32 separate multiply-accumulate paths, each of which processes an incoming sample in parallel. Total processing capability per device is 320 million multiply/accumulate operations per second. The availability of such devices makes digital filtering methods the preferred method for bar code print locating. With this device, filters of arbitrary lengths (in groups of 32 taps) may be effected by cascading of DSP devices.

In this application, a 64 tap DSP filter 200 was used; this requiring the use of two DSP filter devices. Filter length is a tradeoff between (1) cost of implementation, (2) sharpness of the filter response, and (3) ability of the filter to respond to skewed bar code patterns.

Of significant importance to successful operation of this digital filter method over the 22±2 bar codes/inch pitch requirement is in achieving this wide band response (20–24 bars/in) with acceptable performance; digital filters of longer length would be much more sharply tuned and could be made to respond at a much higher amplitude but for only a single pitch, i.e., 21 pitch.

Figure 11:
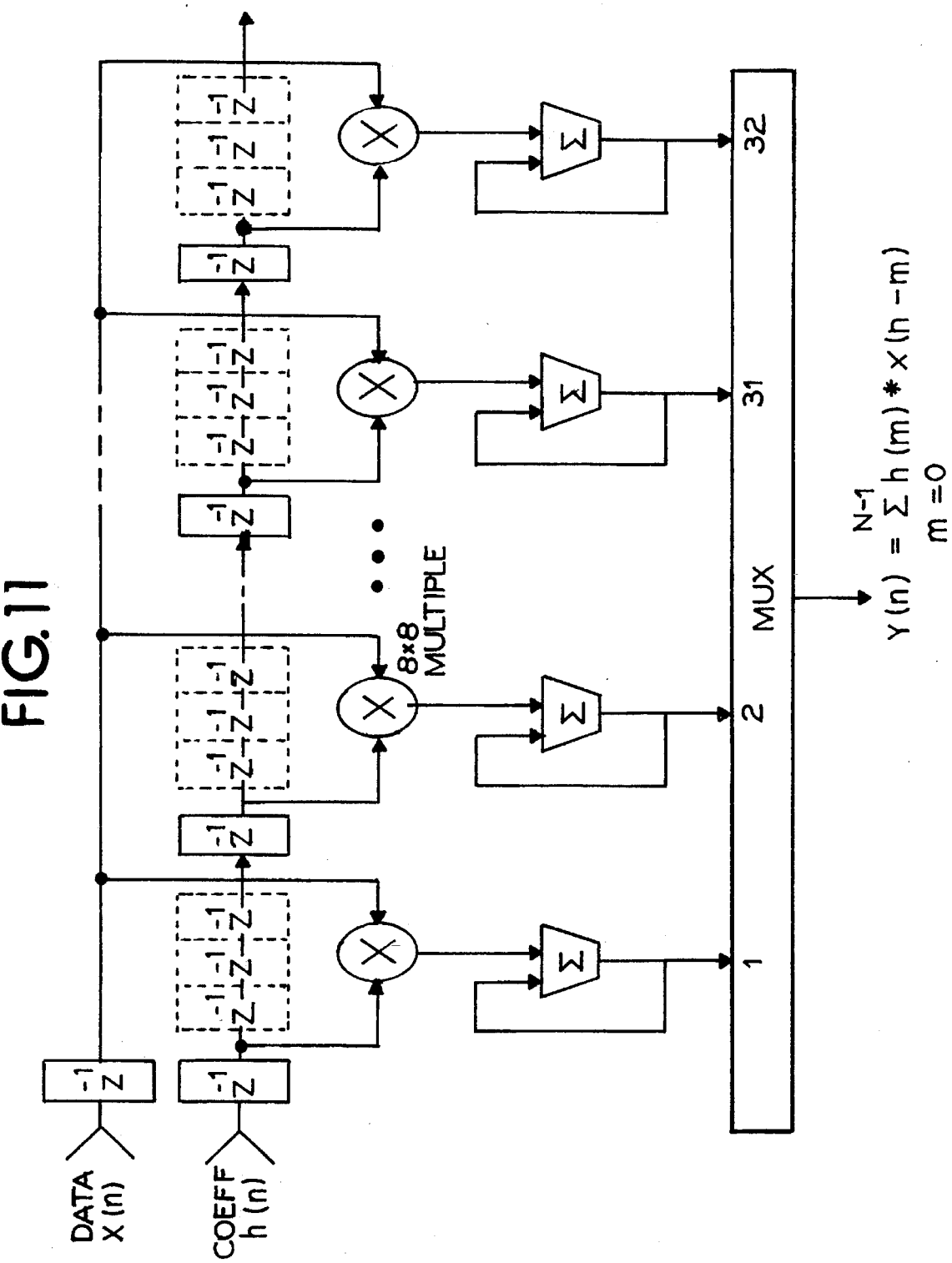
FIG. 11 is a schematic of a digital matched filter.

Considering all factors, a filter length of 64 taps was used; this providing a filter processing length of (7.815)(64)=0.5 inches. The filter 200 thus "sees" a horizontal scan area of 0.5 inches in length and computes a response by processing 64 data samples contained in the 0.5 inch area simultaneously. This filtering process is repeated for every 7.8125 mils of image area. Thus, the filter 200 processes a new pixel value plus the last 63 pixel values simultaneously. Spatial image patterns which correspond to filter coefficient patterns thus repeat, or line up with, each other 10 times (for 50 mil pitch spacing and 500 mil length) in a 0.5 inch sample and generate a high filter output at that image position. Response of the filter 200 to random, or non-repeating image patterns, is much lower than that to a repeating pattern for which the filter coefficients have been designed to detect. FIG. 11 illustrates an eight pitch filter and its response to 8 pitch printing versus its response to random pictorial data. Reference to FIG. 11 provides an appreciation of how a 64 tap filter functions, only on a smaller scale.

A set of filter coefficients which successfully detect 20–24 pitch bar codes is given below in Table 1:

TABLE 1

COEFFICIENT VALUES FOR RECOGNITION OF 20–24 PITCH POSTNET BAR CODES USING A 64 TAP IMNOS IS A 100 DIGITAL SIGNAL PROCESSOR

| TAP | VALUE | TAP | VALUE |
|---|---|---|---|
| 1 | −4 | 33 | −5 |
| 2 | −2 | 34 | 3 |
| 3 | 3 | 35 | 3 |
| 4 | 0 | 36 | 3 |
| 5 | 0 | 37 | , 0 |
| 6 | 0 | 38 | −6 |
| 7 | −7 | 39 | −2 |

TABLE 1-continued

COEFFICIENT VALUES FOR RECOGNITION OF 20-24
PITCH POSTNET BAR CODES USING A 64 TAP IMNOS
IS A 100 DIGITAL SIGNAL PROCESSOR

| TAP | VALUE | TAP | VALUE |
|---|---|---|---|
| 8 | 1 | 40 | 2 |
| 9 | 0 | 41 | 3 |
| 10 | 0 | 42 | 2 |
| 11 | 0 | 43 | −1 |
| 12 | 1 | 44 | −2 |
| 13 | 0 | 45 | −1 |
| 14 | −1 | 46 | 0 |
| 15 | 0 | 47 | 3 |
| 16 | −1 | 48 | 0 |
| 17 | 1 | 49 | −1 |
| 18 | 3 | 50 | 0 |
| 19 | 0 | 51 | 0 |
| 20 | −2 | 52 | 0 |
| 21 | −3 | 53 | 0 |
| 22 | 0 | 54 | 0 |
| 23 | 3 | 55 | 0 |
| 24 | 3 | 56 | 0 |
| 25 | 2 | 57 | 2 |
| 26 | −5 | 58 | −1 |
| 27 | −6 | 59 | −2 |
| 28 | 2 | 60 | 2 |
| 29 | 3 | 61 | 0 |
| 30 | 3 | 62 | 0 |
| 31 | 3 | 63 | 3 |
| 32 | −7 | 64 | 0 |

If the filter coefficients had been designed for a single pitch, i.e., 22 pitch, then 10 repeating patterns of coefficients would be visible; the wide band response of the 20–24 pitch requirement modifies the coefficients so that full repeating patterns in the filter coefficients are not present. A reasonable set of filter coefficients can be designed using conventional band pass filter methods which assume sinsoidual input signals. A more sophisticated program has been developed which uses rectangular input waveforms more typical of bar code generated patterns. This providing filter coefficients which provide improved performance over sinsoidual design methods.

As discussed previously, the basic structure of a digital filter is illustrated in FIG. 11. The mathematical computation performed to calculate y(n), the filter output, involves M×N multiply and accumulate operations where M is the number of taps in the filter and N is the number of input samples processed.

Figure 12:
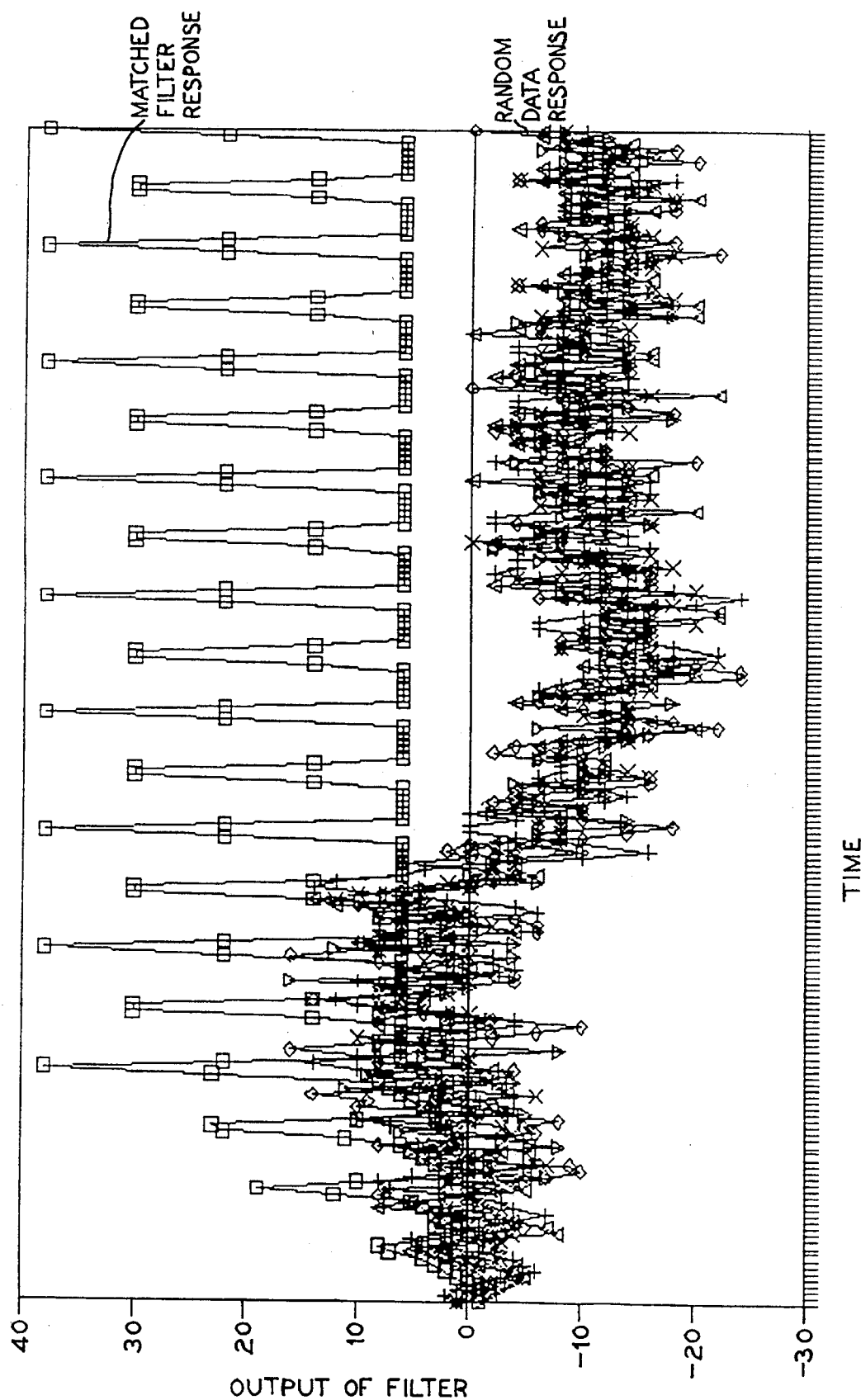
FIG. 12 is a graph illustrating outputs for the digital matched filter used in the processor assembly of FIG. 10.

For the present application, the DSP device 200 became a spatial filter tuned to the known bar code print pattern. A spatial convolution between the continuous input image and the filter whose tap coefficients were designed to recognize the bar code pattern occurs at up to 10 MHZ data rates. When the bar code image passes through the filter, a maximum correlation between image and programmed tap coefficients occurs and the filter outputs a high peak. For repetitive signals, such as the bar code patterns, repetitive peaks are generated at the positions of maximum correlation values. All other image patterns produce a greatly reduced output of random values and timing, as illustrated in FIG. 12.

To accomplish the foregoing, the digital filter 200 performs cross-correlations of digital grey scale data dumped from one of the memories 164 or 166 against the internal filter coefficients. The filter 200 "examines" data representing a half inch wide area in parallel, so small degradations in the image of a single bar pattern does not substantially reduce filter output.

A substantial feature of the invention is the ability to perform the digital filtering in grey scale image form. This ability adds major performance gains over filtering with binary images in which multiplication functions are replaced with addition functions; it also eliminates the need to perform thresholding on the image prior to filtering.

Since a bar code pattern is 1.5–2.5 inches in length, both the magnitude of the filter response and the time duration of the response can be used to discriminate bar code patterns from other interfering patterns of shorter duration or smaller amplitudes.

Figure 21:
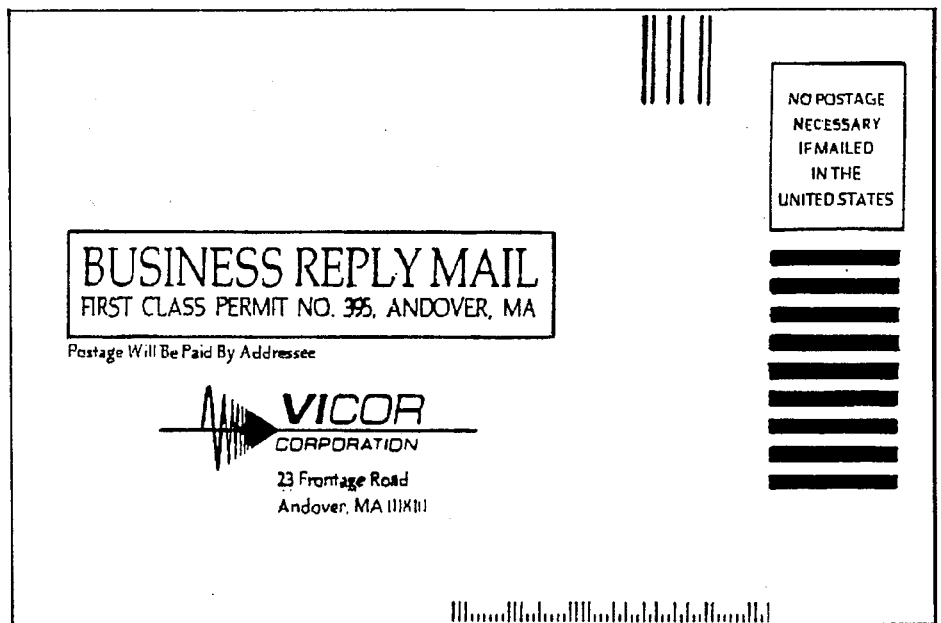
FIG. 21 illustrates a typical business reply card.
Figure 22:
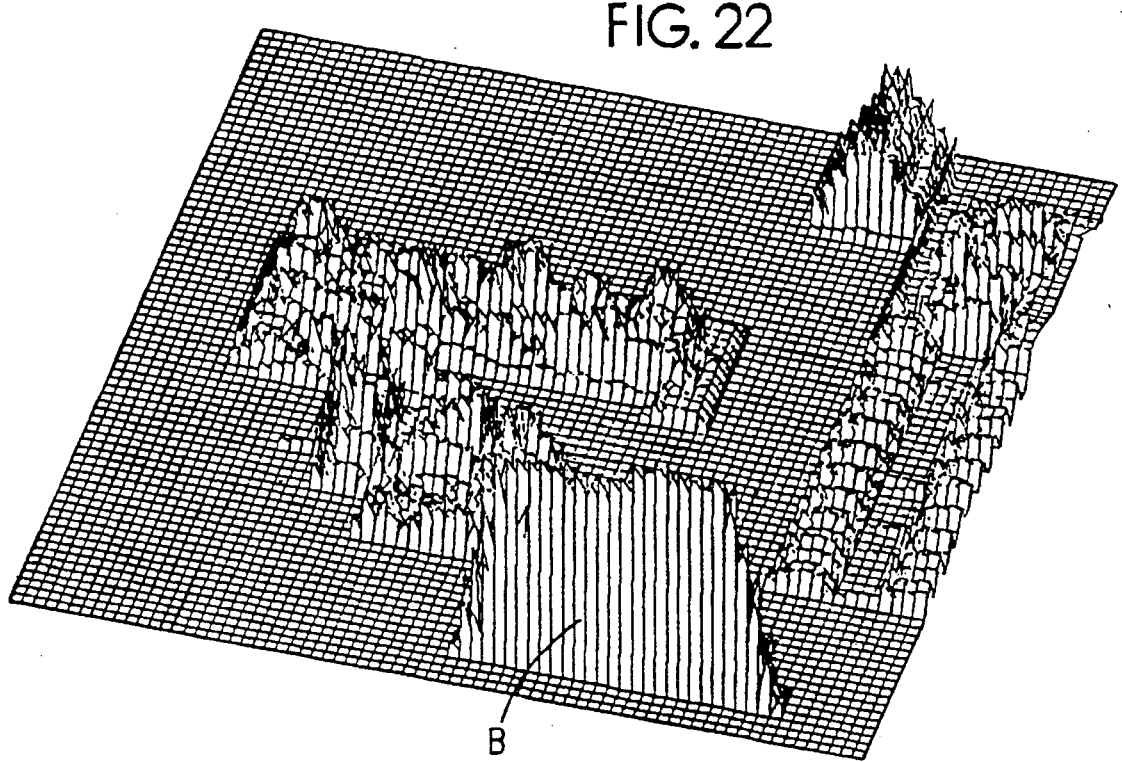
FIG. 22 is a three-dimensional graph of a response of a filter in accordance with the invention.

In this regard, reference should be made to FIGS. 21 and 22, wherein a typical business reply mail piece with a POSTNET bar code A is illustrated and a corresponding three-dimensional plot of a filter response is provided. As illustrated in FIG. 21, the filter response B for the bar code is visibly of greater amplitude than the responses for the other printed data. A threshold value can thus be chosen which must be exceeded before a bar code is recognized. Further, the duration of the bar code response B is of a defined duration. Thus, a minimum duration of filter responses above the threshold can be specified before a bar code is recognized.

The matched filter method is actually a linear template matching process. The filter will respond to the pattern programmed into it and ignore all other patterns.

Important to digital filter design is to design a set of coefficients which are broadly enough tuned so that real world image variations can be reliably handled. A danger is that the filter can be tuned so precisely that it will recognize only perfect image patterns and may not see valid degraded patterns. On the other hand, with a well designed set of coefficients, the filter has the capability to recognize its specific repetitive pattern even with high degradation present.

Figure 13:
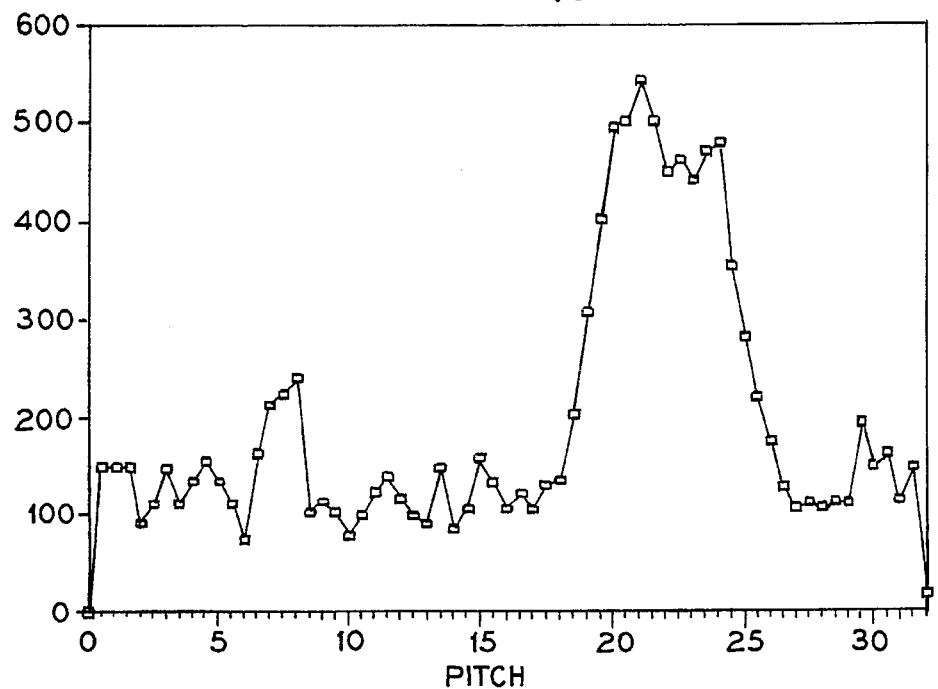
FIG. 13 is a graph illustrating filter response vs print pitch for the filter used in processor assembly of FIG. 10.

A complicating factor in the USPS POSTNET application is the requirement for a wide response filter, i.e., from 20 pitch to 24 pitch. This was achieved by the development of filter coefficient design methods which broadened the response of the filter yet retained the discrimination required to reject other pitches and graphical/pictorial printing. Since 64 input sample points are being processed and summed simultaneously, a few missing samples will affect the output only according to their percentage of the total taps. A filter output response using the coefficients listed in Table 1 is illustrated in FIG. 13.

In previous work associated with recognizing character pitches for address block location functions, it was found that a filter could reliably distinguish between 10 pitch printing and 12 pitch printing. The spatial difference in character positioning between 10 pitch and 12 pitch characters is only 17 mils, yet the filter 200 had no problem identifying which was present.

Post Filter Processing

Figure 14:
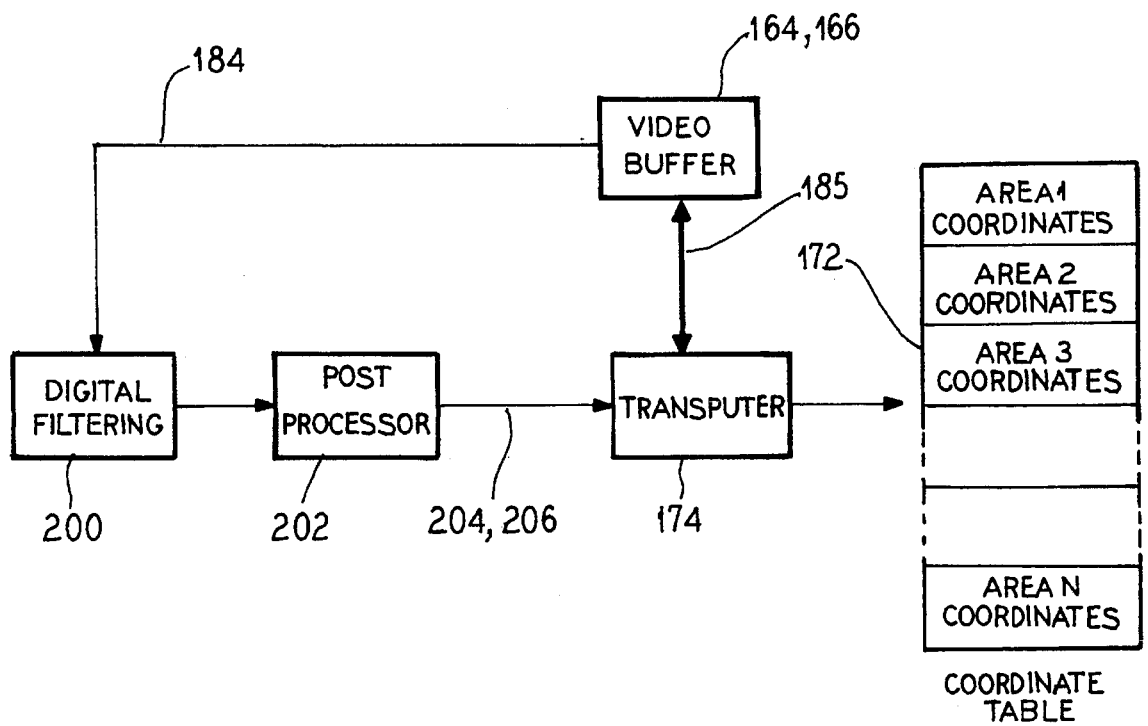
FIG. 14 is a block diagram illustrating a sub-system for generating image window coordinates.

As illustrated in FIGS. 9, 10, and 14, the image data passed through the filter 200 is received by a processor 202 referred to as the post filter processor 202. The post filter processor 202 is used to temper the response of the filter 200 and to detect a filter response indicative of the presence of the specific printed data of interest using the threshold and duration parameters discussed above. To this end, the post filter processor 202 is operatively coupled to the microcomputer 174.

Figure 15:
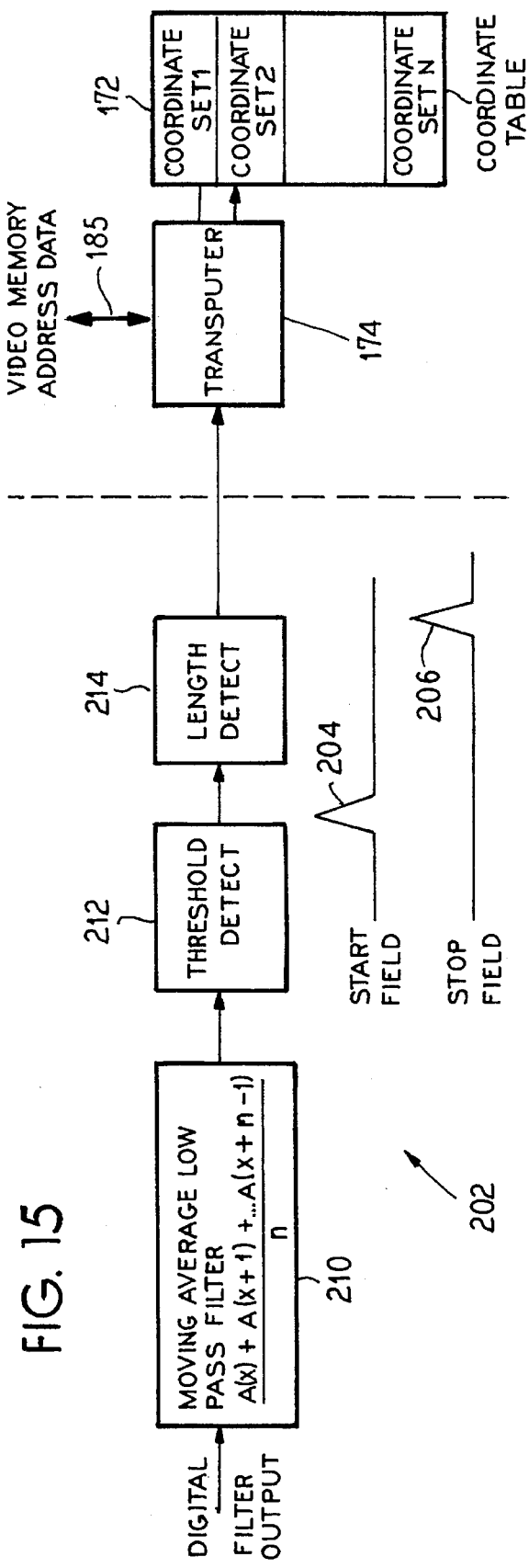
FIG. 15 is a block diagram of a portion of the processor assembly by FIG. 10.

Essentially, the post filter processor 202 acts as a low pass filter on the output of the digital filter 200 to minimize noisy outputs of the filter 200 caused by degraded or skewed print. The post filter 202 processor is configured to determine the magnitude and duration of a filter output that suffices to indicate the presence of the printed matter of interest, in this embodiment a POSTNET bar code. As illustrated in FIG. 15, the post filter processor 202 includes a low pass filter 210, threshold surpassing detection section 212, and length of threshold section 214. These sections can be formed of hard wired circuitry or software.

As also illustrated in FIG. 15, the post filter processor 202 issues a first start pulse 204 to the computer 174 when it observes the beginning of a filter response above the filter threshold and issues a second stop pulse 206 to the computer 174 when the amplitude of the response drops below the threshold for a given period of time. The computer 174 "sits" on the address data bus 185 and captures the physical memory address associated with the data corresponding to the pulse 204 or 206 each time the post filter processor 202 sends it a pulse. The area defined by the address associated with both the start and stop pulses 204 and 206 identifies the area in the total image memory, a window, which likely contains the printing with the desired characteristics.

The computer 174 is operative to store a list of the memory addresses sampled coincident with the post filter processor 202 pulses 204 and 206 in the memory 172. The computer 174 then analyzes the groupings of these memory addresses to determine the most likely to have printed areas of interest. For each potential area, a set of four coordinates are generated to be sent back to the image memory 162 or 164 via the address data bus 185 when image filtering is completed.

After the digital filter 200, post filter processor 202, and the computer 174 have interacted to derive the potential locations of printing characteristics of interest in the total image, these individual areas are processed in a priority sequence. In the present embodiment, the potential areas are organized in view of the amplitude and duration of the response. The most promising potential area is evaluated first, then the next most promising potential area is evaluated, and so on. The physical location of the potential areas in the image can also be used for prioritization since address block areas on mailpieces follow certain known patterns, for example, location on an envelope.

To this end, after completion of filtering, the computer 174 then addresses the appropriate memory 164 or 166 by a set of four coordinates containing the area(s) or window(s) identified by filtering. The memory 164 or 166 outputs the image data within these window areas one at a time via the bus 185. These data are sent to a threshold/recognition board 210 in the form of vertical scan lines for conversion from grey scale representation to binary representation for ease in bar code recognition function.

The organization and characteristics of the processing elements result in very little processing overhead and accounts for the processing speeds attainable. For example, the entire image is output to the digital filter 200 in one continuous operation and the filter 200 responds continuously in real-time to the image characteristics.

Threshold Processing

A major imaging concern is the broad range of background and print contrast ratios which can be encountered by the system. Dynamic thresholding of some sort is needed for any system handling degraded input. The problem with conventional thresholding methods is that they are too computationally intensive to be applied in real-time over wide areas of the image in a conventional manner. Yet, some level of dynamic thresholding is required for successful bar code location algorithms for degraded images.

A significant advantage of using grey scale image representation for filtering to derive bar code windows is that an area of the image requiring thresholding is reduced to only the potential bar code windows identified by the post filter processor 202. In the case in which the first window choice contains the bar code field, only 7–8 percent of the full image has to be thresholded. With current technology, thresholding the full image is not possible under real-time constraints imposed by the postal applications.

Even with the advantage of having to threshold the much reduced window areas identified by filter processing, a high speed thresholding technique is still required.

Figure 16:
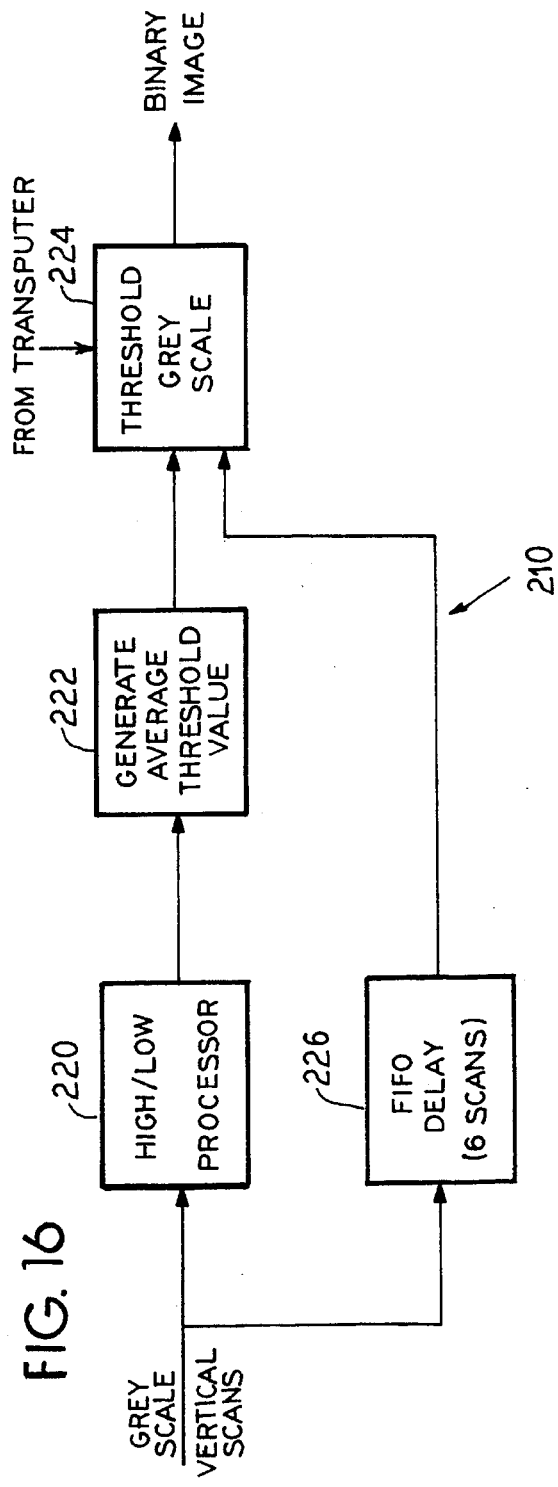
FIG. 16 is a block diagram of a system for thresholded image data.

As illustrated in FIGS. 9, 10, and 16, the threshold processor 210 has an input coupled to the image data bus 184 and is operative to receive image data upon receipt of the "Th" signal.

Essentially, the threshold processer 210 converts the grey scale data within a potential area or window to binary data to simplify recognition processing. A "look ahead" feature is used to determine the best threshold value to use in converting the image to binary, since this is a critical step in separating the printed character or bar code from an interfering background. The threshold method delays the image to be processed by several scan columns while looking at the non-delayed image to determine the best threshold. The non-delayed image is processed to find the highest value of black printing within the bar code and the highest value of background outside the bar code. The area to be analyzed prior to thresholding is sized such that a bar code stroke and a space between strokes is always present in the area.

Knowing the maximum signal from the bar code stroke and the maximum signal from the surrounding background area provides the information to set the threshold approximately halfway between the black and white values determined. The average of the two values is then used to threshold the delayed image which will be converted to binary form. These maximum black/minimum white values are independently derived for each bar code; and this provides the ability to threshold over a bar code area of continuously changing background.

To accomplish the foregoing, as illustrated in FIG. 16, the threshold processor 210 comprises a high/low processor 220, an average threshold value generator 222, a threshold grey scale generator 224, and a FIFO (First-In-First-Out) delay 226. Grey scale data enters the threshold processor 210 and is diverted to both the high/low processor 210 and the FIFO delay 226. The high/low processor 220 determines the value of the blackest pixel present in a bar and the value of the whitest pixel present in the background. The average threshold value generator 224 generates a value midway between these two values determined by the high/low processor 220.

In the meantime, the FIFO delay 226 delays the image data by several scan columns. The delayed image data is then supplied to the threshold grey scale generator 224 as is the average threshold value generated by the average threshold value generator 222.

The threshold grey scale generator 224 then effects a comparison between the delay image data and the average threshold value. Any delay image pixel having a value greater than the average threshold value is assigned value "1" while any value less than the average threshold value is assigned the value "0".

In some ranges of these two values, additional steps are needed. These steps provide the ability to offset the average value calculated by zero, positive, or negative values to fine tune the threshold value used.

If a bar code field is not successfully read when thresholded with a zero offset, for example, the computer 174 can load a positive or negative offset value into the threshold circuitry and re-process the grey scale image area again by reading the window area from the video buffer a second time with the new threshold value. This can be repeated a third time, if necessary.

The values of the threshold offsets can also be adjusted for additional read attempts if desirable.

Once thresholding is complete, the processor assembly then subjects the thresholded data to a recognition function 211 to identify the code present, if any, as illustrated in FIGS. 10 and 11.

Recognition Logic

The recognition logic 211 preferably uses two techniques in parallel to recognize tall/full and short/half bars. Although one technique is sufficient, the use of two techniques provides a check function and thus added assurance of correct recognition. Further, no processing techniques are executed in parallel.

The first technique uses gate array logic to decode binary patterns of the threshold image. The second technique uses a table look-up method in which the pixel pattern in a vertical scan is used to address a large memory containing decoded pixel patterns.

Figure 17:
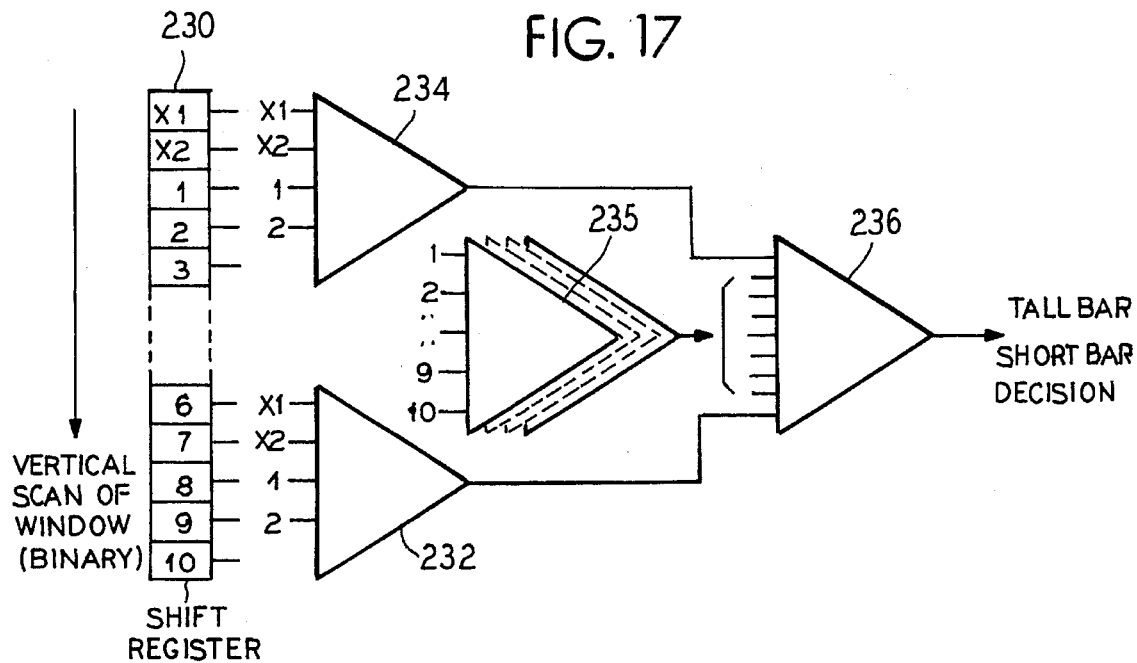
FIG. 17 illustrates a gate array decoder for tall bar and short bar recognition.

The gate array decoding logic technique is illustrated in FIG. 17. In this technique, key steps are the recognition of:

(1) top of a bar;

(2) body of a bar; and (c) bottom of a bar.

As illustrated in this technique, a shift register 230 and various logic gates 232, 234, 235, and 236 are used. Vertical scan line data is shifted vertically downward (i.e., bottom end first) through the shift register 230 and the data is analyzed as it is shifted.

The shift register 230 preferably is a 12 bit register. A single bar is never more than 10 black pixels tall. Accordingly, when a bar is fully shifted into the register 230, two extra registers should be present.

Figure 19:
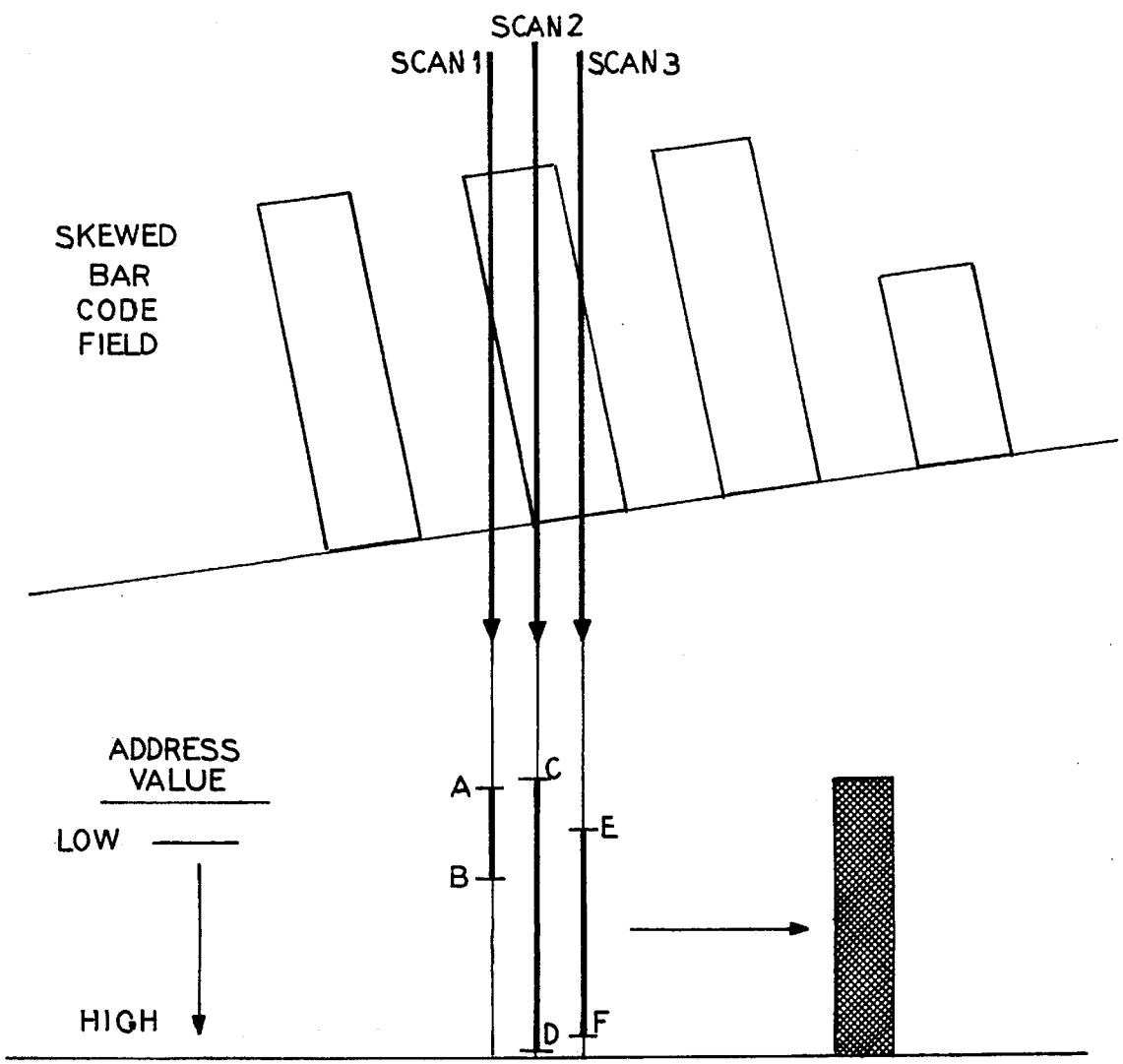
FIG. 19 illustrates a technique for compensating for skewed printed data.

As illustrated in FIG. 17, four bits of the register 230 are particularly observed during shifting, namely the top four, referred to in FIG. 19 as register locations X1, X2, 1, and 2. Certain observed patterns indicate either the presence of the bottom end of a bar or the top end of a bar.

In the presently preferred embodiment, a transition from two white pixels (0) to two black pixels (1) indicates the presence of the bottom end of the bar and is observed by a bottom detector comprising the gate array 232. Similarly, a transition from two black pixels to two white pixels indicates the presence of the top of a bar. A bar top is observed by a top detector comprising the gate array 234. Sequential logic 236 requires that for valid recognition of a bar, a bottom be recognized by the array 232 before a top is recognized-by the array 234.

Once a top of a bar is detected, the lower ten bits (i.e., 1–10) in the shift register 230 are decoded and clocked into the logical gate arrays 235. If, for example, all ten bits are binary 1's (i.e., black pixels), then a perfect image of a full bar is present.

To accommodate for imperfect images, additional bit patterns are also decoded. Preferably, the decoding gates 235 decode as bars all bit patterns having less than two adjacent white pixels (i.e. less than two adjacent 0's). For example, a pattern 1011011101 would be recognized as a full bar. Further, as a minimum, eight pixels are required for detection of a full bar while at least three black pixels must be present for recognition of a half bar.

Figure 18:
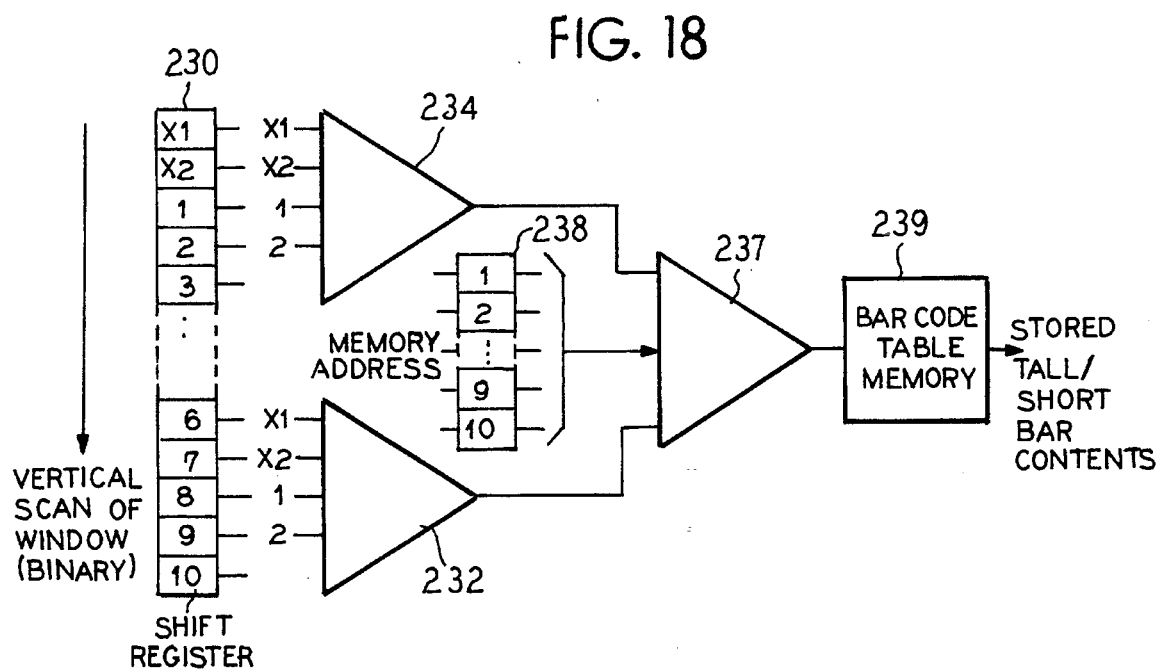
FIG. 18 illustrates a table-look-up arrangement for tall bar and short bar recognition.

The table look up technique is illustrated in FIG. 18. It can be appreciated that the gate array decoding technique described above requires changes in gate structures if patterns are added or deleted, as a result, for example, of a bar code pixel pattern definition change. The table look up technique relies on software and can easily be reconfigured.

As illustrated, once a bottom and a top of a bar have been detected as discussed above, the ten-bit pattern in the lower 10 bits in the shift register 230 are captured in addressing circuitry 238 and used to address a 1024 ($2^{10}$) memory 239. The ten-bit pattern directly identifies a location in the memory which preferably contains a two-bit value which identifies whether the ten-bit pattern is a full/tall bar, a half/short bar, or not a valid bar pattern. Preferably, these values are assigned as follows:

tall/full bar=11 short/half bar=01 no bar=00

Again, sequential logic 237 ensures that detection of a bottom of a bar must occur before detection of a top of a bar, before a bar can validly be detected.

It can be appreciated that the table look-up technique provides the ability to change bar code bit pattern definitions simply by changing the values stored at the memory locations. Thus, the table look-up provides for great flexibility in detecting bars of a bar code.

One technique for accommodating recognition of bar code patterns with skewed printing is illustrated in FIG. 19. As illustrated, given adjacently recognized bars, if in vertical view, the top end of the second in line recognized bar is higher in vertical position than the bottom end of the first in line recognized bar. The bars are joined as one for purposes of recognition.

Bar Code Validation

Once a series of tall and short bars are identified, the transputer 174 is used to determine the particular zip code represented by the bar code. The resulting zip code information is provided to the host computer 106 or, e.g., a sorting machine (not illustrated).

The zip code is deciphered in accordance with the protocol set forth at the beginning of this detailed description. Prior to actual decoding, however, the code is validated.

One method of checking the validity of a disclosed bar code is to:

(1) Check number of the bars in the field (2) Check for frame start and frame stop bars (3) Check for the 2 tall/3 short character format (4) Recompute the check sum and compare it to the checksum read In the present embodiment, in addition to the foregoing, the validity and interpretation of characters read is accomplished by a table look up method in which the bit pattern read for a character is used as an address to address a 32 word memory. All possible 5 bit combinations have memory locations; those locations with two "1"s and three "0"s containing the ASCII code for the character. All other locations contain an error character indicating an incorrect combination of bits. A one bit flag in each error word indicates whether the error is an extra "1" or an extra "0". Thus, in a rapid manner, memory locations can be accessed and that memory location will identify whether a deciphered character is erroneous or not.

The validation functions are performed via appropriate software in the computer 174.

Host Computer

The host computer 106 is used to perform a variety of functions. Data and programs are downloaded from the computer into the processor assembly 104 to initialize same. Further, the computer 106 can be used to perform diagnostics. In the preferred embodiment, the computer 106 comprises a microprocessor based personal computer such as the Compaq 386 brand personal computer.

System Timing

Figure 20:
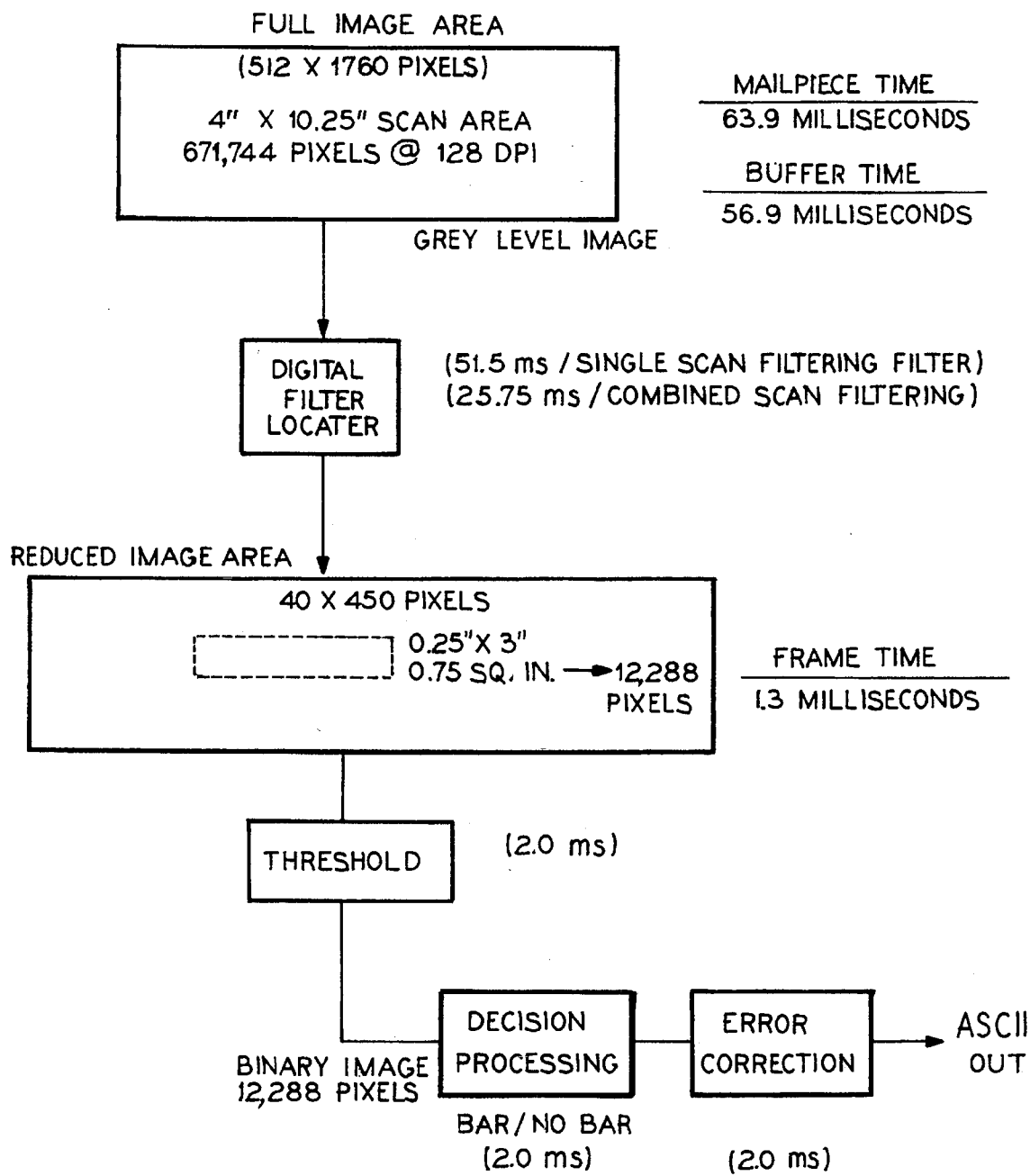
FIG. 20 is a data flow timing diagram for the system of FIG. 1.

In FIG. 20, a data flow diagram is illustrated for the system 100. Preferably, each mailpiece is processed in 70 msec or less, preferably 63.9 msec.

To this end, as illustrated, each mailpiece is allocated about 63.9 msec. with 56.9 msec. of that time being allocated to filling one buffer with pixel data, as described above. Digital matched filtering takes place over about 25.7 msec. Prioritization and determination of a reduced area of a window takes about 1.3 msec. Thresholding takes about 2 msec.

Bar code recognition takes about 2 msec. as does error correction to a recognized code. Finally, an overhead time of about 6 ms is present.

Because two buffers 164 and 166 are alternatively used, the effective processing rate is reduced for each mailpiece because, as one mailpiece is being processed, a second can be scanned. Thus, the overall scan of 70 msec. per mailpiece can easily be reached.

While preferred embodiments have been shown, modifications and changes may become apparent to those skilled in the art which shall fall within the spirit and scope of the invention. It is intended that such modifications and changes be covered by the attached claims.

We claim:

1. An apparatus for recognizing POSNET bar codes comprising:

(a) an imaging assembly operative to scan a piece of mail and to generate digital vertical scan line pixel data relating thereto;

(b) a memory operative to store said digital vertical scan line pixel data in a matrix and to allow said pixel data to be read therefrom either as horizontal or vertical scan lines;

(c) a direct memory access controller coupled to said memory and operative to directly access said memory and read portions thereof and selectively transmit either vertical scan lines of pixel data or horizontal scan lines of pixel data;

(d) a digital matched filter operative to receive horizontal scan lines of said pixel data from said memory under the control of said direct memory access controller, said digital matched filter having coefficients selected to high cross-correlate with pitches of said POSNET bar codes, said digital matched filter having an output;

(e) a post filter processor operative to receive said output from said digital matched filter to identify high cross-correlations between said digital matched filter coefficients and a horizontal scan line of pixel data and to generate start and stop signals indicative of a beginning and ending of at least one area of pixel data in said memory having a high cross-correlation with said filter coefficients;

(f) a device operative to receive said start and stop signals and to generate memory addresses defining a perimeter within said memory and about said pixel data in an area of said memory with respect to which a high cross correlation was detected; and (g) a recognition circuit operative to receive vertical scan lines of pixel data from said area of high cross correlation from said memory under the control of said direct memory access controller and to perform gray scale to binary image conversion on said pixel data within said area and to decipher any bars of a bar code therein.

2. The apparatus of claim 1, wherein said post filter processor coupled to said output of said digital matched is operative to recognize said high cross-correlation by recognizing an output in excess of a predetermined threshold for a duration greater than a predetermined length of time.

3. An apparatus for locating and identifying within an image, in real-time, printed data with a known spatial characteristic, comprising:

(a) an imaging assembly operating to scan an image, and to generate digital vertical scan line pixel data relating thereto;

(b) a memory operative to store said digital vertical scan line pixel data in a matrix and to allow said pixel data to be read therefrom as either horizontal scan lines or vertical scan lines;

(c) a direct memory access controller coupled to said memory and operative to directly access said memory and read portions thereof and selectively transmit portions of said pixel data either as vertical scan lines of pixel data or horizontal scan lines of pixel data;

(d) a digital matched filter operative to receive horizontal scan lines of said pixel data from said memory under control of said direct memory access controller, said filter having coefficients matching said known spatial characteristic, said digital matched filter having an output;

(e) a post filter processor operative to receive said output from said digital matched filter to identify a high cross correlation signature between said digital matched filter coefficients and said horizontal scan lines of said pixel data and to generate start and stop signals indicative of a beginning and ending of at least one area of said matrix having pixel data with a high cross correlation with said filter coefficients;

(f) a device operative to receive said start and stop signals and to generate memory addresses defining a perimeter within said memory and about said pixel data in said matrix with respect to which a high cross-correlation was detect; and (g) a recognition circuit coupled to said memory and operative to receive vertical scan lines of pixel data from within said perimeter under the control of said direct memory access controller and to recognize and decipher any printed matter of interest within said area.

4. The apparatus of claim 3, further comprising a threshold/recognition circuit operative to extract an area of high correlation from the image and to perform grey scale to binary image conversion on said pixel data within said area.

5. The apparatus of claim 3, further comprising a thresholding circuit operative to convert grey scale image data to binary data by formulating a threshold value specifically for said perimeter, thereby providing the ability to successfully threshold in the presence of interfering and varying background conditions.

6. The apparatus of claim 3, further comprising an image correcting circuit which measures faulty correlation between said pixel data and said image, calculates correction values for each pixel data, and continuously alters said pixel data to eliminate said faulty correlation for each pixel.

7. The apparatus of claim 3, wherein said digital filter comprises at least one 32 tap filter.

8. The apparatus of claim 3, wherein said direct memory access controller is operative to output only pixel data contained within said perimeter.

9. The apparatus of claim 3, wherein said printed data comprises POSTNET bar codes.

10. An apparatus for locating and identifying within an image, in real-time, printed data with a known spatial characteristic, comprising:

(a) an imaging assembly operative to scan an image, and to generate digital vertical scan line pixel data;

(b) a memory operative to receive said digital vertical scan line pixel data and to transmit both horizontal and vertical scan line pixel data therefrom;

(c) a digital matched filter operative to receive said digital horizontal scan line pixel data, said filter having coefficients matching said known spatial characteristic, said digital matched filter having an output said digital filter comprising two 32 tap filters operatively coupled to provide a 64 tap filter;

(d) a post filter processor operative to receive said output from said digital matched filter to identify a high cross correlation between said digital matched filter coefficients and a portion of said image and to generate start and stop signals indicative to a beginning and ending of an area of high cross correlation; and (e) a device operative to receive said start and stop signals and to generate memory addresses defining a perimeter within said memory and about pixel data relating to said portions of said image with respect to which a high cross-correlation was detected.

\* \* \* \* \*

UNITED STATES PATENT AND TRADEMARK OFFICE
CERTIFICATE OF CORRECTION

PATENT NO. : 5,563,955
DATED : October 8, 1996
INVENTOR(S) : J. E. Bass, et al.

It is certified that error appears in the above-indentified patent and that said Letters Patent is hereby corrected as shown below:

Column 1, line 19, delete ". ," after "noise,"

Column 1, line 39, change "technique" to --Technique--

Column 5, line 10, delete the dash after "binary"

Column 5, line 56, change the commas to periods in "0,125±0,015" and "0,050±0,015"

Column 5, line 58, change the comma to a period in "0,025"

Column 6, line 7, change "2345-6789" to --92345-6789--

Column 8, line 11, change " (4Δx10.25") " to --(4"x10.25")--

Column 20, line 2, change "high" to --highly--

Column 20, line 64, change "detect" to --detected--

Signed and Sealed this

Fifteenth Day of April, 1997

Attest:

BRUCE LEHMAN

*Attesting Officer*  *Commissioner of Patents and Trademarks*